United States Patent
Okada et al.

(10) Patent No.: US 12,524,176 B2
(45) Date of Patent: Jan. 13, 2026

(54) STORAGE SYSTEM AND METHOD FOR REPLICATION BASED ON LOAD PREDICTION

(71) Applicant: Hitachi Vantara, Ltd., Yokohama (JP)

(72) Inventors: Naoya Okada, Tokyo (JP); Takahiro Yamamoto, Tokyo (JP); Yoshinori Ohira, Tokyo (JP)

(73) Assignee: HITACHI VANTARA, LTD., Yokohama (JP)

( * ) Notice: Subject to any disclaimer, the term of this patent is extended or adjusted under 35 U.S.C. 154(b) by 0 days.

(21) Appl. No.: 18/828,524

(22) Filed: Sep. 9, 2024

(65) Prior Publication Data

US 2025/0298532 A1 Sep. 25, 2025

(30) Foreign Application Priority Data

Mar. 22, 2024 (JP) ................. 2024-047132

(51) Int. Cl.
 *G06F 3/06* (2006.01)
(52) U.S. Cl.
 CPC ............ *G06F 3/065* (2013.01); *G06F 3/0605* (2013.01); *G06F 3/0631* (2013.01); *G06F 3/067* (2013.01)
(58) Field of Classification Search
 CPC ...... G06F 3/0605; G06F 3/065; G06F 3/0631; G06F 3/067
 USPC ........................................... 711/161
 See application file for complete search history.

(56) References Cited

U.S. PATENT DOCUMENTS

| | | | |
|---|---|---|---|
| 11,762,764 B1 * | 9/2023 | Kirkpatrick | G06F 3/0619 |
| | | | 711/202 |
| 2005/0033827 A1 | 2/2005 | Yamagami | |
| 2020/0125280 A1 * | 4/2020 | Chen | G06F 11/3414 |
| 2021/0294497 A1 * | 9/2021 | Deguchi | G06F 11/3409 |
| 2022/0043695 A1 * | 2/2022 | Gallegos | G06F 3/0605 |
| 2023/0325084 A1 * | 10/2023 | Achkinazi | G06F 3/0688 |
| | | | 711/113 |
| 2023/0409396 A1 * | 12/2023 | Kulkarni | G06F 9/505 |
| 2024/0020167 A1 * | 1/2024 | Ou | G06F 16/278 |
| 2024/0143177 A1 * | 5/2024 | Thakur | G06F 3/0653 |
| 2025/0165175 A1 * | 5/2025 | Sillifant | G06F 3/067 |
| 2025/0256568 A1 * | 8/2025 | Zhao | B60L 15/2054 |

FOREIGN PATENT DOCUMENTS

JP 2005-018736 A 1/2005

* cited by examiner

*Primary Examiner* — Than Nguyen
(74) *Attorney, Agent, or Firm* — MATTINGLY & MALUR, PC

(57) ABSTRACT

The influence of new deployment of volumes on the performance is predicted with accuracy in a storage system that includes a main site holding a primary volume and a sub-site holding a secondary volume and a journal volume. The main site has one or multiple nodes. The sub-site has multiple nodes. In creating a new secondary volume and a new journal volume in the sub-site, a management program that operates in any node or a predetermined management apparatus predicts the load of the processor under an operation condition in which redundancy processing is executed in the sub-site regarding the new secondary volume, predicts the load under an operation condition in which redundancy processing is not executed in the sub-site regarding the new journal volume, and selects a node that becomes the deployment destination of the new volumes on the basis of the result of the prediction of the load.

7 Claims, 18 Drawing Sheets

FIG. 7

SYSTEM CONFIGURATION MANAGEMENT TABLE

NODE CONFIGURATION MANAGEMENT TABLE

| NODE ID | STATE | DRIVE ID LIST | PORT ID LIST | DATA PROTECTION |
|---|---|---|---|---|
| 0 | Warning | 0, 1, 2 | 0, 1 | MIRROR |
| 1 | Normal | 3, 4 | 2, 3 | MIRROR |
| 2 | Normal | 5, 6 | 4, 5 | MIRROR |
| ... | ... | ... | ... | ... |

711  712  713  714  715

DRIVE CONFIGURATION MANAGEMENT TABLE

| DRIVE ID | STATE | SIZE |
|---|---|---|
| 0 | Normal | 1400 GB |
| 1 | Normal | 1400 GB |
| 2 | Failure | 2000 GB |
| ... | ... | ... |

721  722  723

PORT CONFIGURATION MANAGEMENT TABLE

| PORT ID | STATE | Address |
|---|---|---|
| 0 | Normal | 172.12.16.200 |
| 1 | Normal | 172.12.16.201 |
| 2 | Normal | 172.12.16.202 |
| ... | ... | ... |

731  732  733

VOLUME CONFIGURATION MANAGEMENT TABLE

| VOLUME ID | STATE | SIZE | DATA DELETION | JOURNAL SETTING |
|---|---|---|---|---|
| 0 | Normal | 1400 GB | INVALID | APPLIED |
| 1 | Normal | 1400 GB | COMPRESSION | NULL |
| 2 | Failure | 2000 GB | COMPRESSION + DEDUPLICATION | NULL |
| ... | ... | ... | ... | ... |

MAXIMUM PERFORMANCE INFORMATION MANAGEMENT TABLE (614a)

CPU INFORMATION MANAGEMENT TABLE (810)

| NODE ID | CPU CORE | CPU GENERATION | CPU FREQUENCY | FORMATION COPY PROCESSING TIME |
|---|---|---|---|---|
| 0 | 0,1,2,3 | 0x0001 | 0.8GHz,...,4GHz | 400us,....,80us |
| 1 | 0,1,2,3 | 0x0001 | 0.8GHz,...,4GHz | 400us,....,80us |
| 2 | 0,1,2,3 | 0x0001 | 0.8GHz,...,4GHz | 400us,....,80us |
| ... | ... | ... | ... | ... |

811  812  813  814  815

DRIVE PERFORMANCE INFORMATION MANAGEMENT TABLE (820)

| DRIVE ID | TYPE | MAXIMUM THROUGHPUT PERFORMANCE | LATENCY |
|---|---|---|---|
| 0 | NVMe SSD | 4GB/s | 100us |
| 1 | HDD | 3GB/s | 10000us |
| 2 | Persistent Store | 1.5GB/s | 500us |
| 3 | Instance Store | 12GB/s | 50us |
| ... | ... | ... | ... |

821  822  823  824

PORT PERFORMANCE INFORMATION MANAGEMENT TABLE (830)

| PORT ID | NIC BANDWIDTH | PORT SHARING WITH Persistent Store |
|---|---|---|
| 0 | 15Gb/s | DRIVE ID2 |
| 1 | 15Gb/s | DRIVE ID2 |
| 2 | 0.1Gb/s | Null |
| ... | ... | ... |

PERFORMANCE HISTORY INFORMATION MANAGEMENT TABLE — 614b

CPU PERFORMANCE HISTORY INFORMATION MANAGEMENT TABLE — 910

| DATA ID | CPU CORE | COLLECTION CLOCK TIME | CPU FREQUENCY | CPU UTILIZATION |
|---|---|---|---|---|
| 0x0001 | 0 | 0x0000 | 2.5GHz | 60% |
| 0x0002 | 0 | 0x0001 | 2.3GHz | 70% |
| ... | ... | ... | ... | ... |
| 0x1002 | 1 | 0x0001 | 3.0GHz | 90% |
| ... | ... | ... | ... | ... |

911  912  913  914  915

DRIVE PERFORMANCE HISTORY INFORMATION MANAGEMENT TABLE — 920

| DATA ID | DRIVE ID | COLLECTION CLOCK TIME | THROUGHPUT | LATENCY |
|---|---|---|---|---|
| 0x10001 | 0 | 0x0000 | 3GB/s | 100us |
| 0x10002 | 0 | 0x0001 | 2GB/s | 90us |
| ... | ... | ... | ... | ... |
| 0x11002 | 1 | 0x0001 | 10GB/s | 50us |
| ... | ... | ... | ... | ... |

921  922  923  924  925

PORT PERFORMANCE HISTORY INFORMATION MANAGEMENT TABLE — 930

| DATA ID | PORT ID | COLLECTION CLOCK TIME | THROUGHPUT |
|---|---|---|---|
| 0x20001 | 0 | 0x0000 | 1GB/s |
| 0x20002 | 0 | 0x0001 | 2GB/s |
| ... | ... | ... | ... |
| 0x21002 | 1 | 0x0001 | 5GB/s |
| ... | ... | ... | ... |

931  932  933  934

VOLUME PERFORMANCE HISTORY INFORMATION MANAGEMENT TABLE — 940

| DATA ID | Vol ID | COLLECTION CLOCK TIME | THROUGHPUT |
|---|---|---|---|
| 0x20001 | 0 | 0x0000 | 1GB/s |
| 0x20002 | 0 | 0x0001 | 2GB/s |
| ... | ... | ... | ... |
| 0x21002 | 1 | 0x0001 | 5GB/s |
| ... | ... | ... | ... |

PAIR CONFIGURATION MANAGEMENT TABLE 612

VOLUME MANAGEMENT TABLE 1010

| VOLUME ID | OWNER NODE ID | RETREAT DESTINATION NODE ID | SIZE | ATTRIBUTE |
|---|---|---|---|---|
| 0 | 0 | 1 | 500 GB | NML_VOL |
| 1 | 1 | 2 | 1200 GB | PAIR_VOL |
| 2 | 1 | 2 | 2400 GB | JNL_VOL |
| ... | ... | ... | ... | ... |

1011  1012  1013  1014  1015

PAIR MANAGEMENT TABLE 1020

| PAIR ID | PRIMARY JOURNAL VOLUME ID | PRIMARY VOLUME ID | SECONDARY JOURNAL VOLUME ID | SECONDARY VOLUME ID | STATE |
|---|---|---|---|---|---|
| 0 | 2 | 1 | 2 | 1 | PAIR |
| 1 | 3 | 5, 6 | 5 | 7, 8 | COPY |
| 2 | 1 | 7 | 1 | 9 | SUSPEND |
| ... | ... | ... | ... | ... | ... |

1021  1022  1023  1024  1025  1026

JOURNAL MANAGEMENT TABLE 1030

| PAIR GROUP ID | JOURNAL ID | P/S VOLUME ID | P/S VOLUME ADDRESS | SIZE | CACHE SEGMENT ID |
|---|---|---|---|---|---|
| 0 | 0 | | | 256KB | |
| 1 | 0 | | | 8KB | |
| 1 | 1 | | | 32KB | |
| ... | ... | ... | ... | | ... |

1031  1032  1033  1034  1035  1036

STORAGE SYSTEM AND METHOD FOR REPLICATION BASED ON LOAD PREDICTION

CROSS-REFERENCE TO RELATED APPLICATION

The present application claims priority from Japanese application JP2024-047132, filed on Mar. 22, 2024, the content of which is hereby incorporated by reference into this application.

BACKGROUND OF THE INVENTION

1. Field of the Invention

The present invention relates to a storage system and a management method for a storage system.

2. Description of the Related Art

As a conventional technology, there has been a remote copy function that replicates a storage system between a plurality of data centers geographically separate. Regarding the remote copy, for example, there is a technique described in JP-2005-18736-A. This bulletin includes a description of "a primary storage system and a secondary storage system being installed at a distance of 100 miles or longer, for example," and also includes a description as follows: "A first storage system stores writing data in a first data volume upon receiving a writing request from a first host relating to the first storage system and generates a journal including control data and journal data. A second storage system includes a journal volume and receives and stores the journal generated by the first storage system in the journal volume. A third storage system includes a second data volume and receives the journal from the second storage system in accordance with information provided by the control data and stores the journal data of the journal in the second storage system."

SUMMARY OF THE INVENTION

Software defined storage (SDS) can be employed as at least a sub-storage system (storage system in a sub-site), out of a main storage system (storage system in a main site) and the sub-storage system. The SDS is based on one or multiple (typically, multiple) storage nodes. These storage nodes exist in an on-premise environment or a cloud environment, for example. The storage node (hereinafter, node) is, for example, a general-purpose calculator and has a cache and a VOL (logical volume). The cache exists typically in a volatile memory, and the VOL is typically based on a persistent storage apparatus.

The main site storage system has a primary volume (PVOL) as a logical volume that becomes a target of access from a host. The sub-site storage system has a secondary volume (SVOL) that is a logical volume corresponding to the PVOL and a journal volume (JVOL) that is a logical volume that holds a journal indicating the contents and order of writing executed to the PVOL.

In the case of newly deploying volumes (SVOL and JVOL) in the sub-site storage system, decision as to which node in the sub-site storage system the volumes are deployed in is important. This is because, in some cases, the load on the node in which the volumes are newly deployed increases and the performance of the node becomes a bottleneck to lower the performance of the storage system.

Thus, the present invention intends to predict the influence of new deployment of volumes on the performance with high accuracy.

In order to achieve the above-described object, one of representative storage systems according to the present invention includes a main site that holds a primary volume that stores host data and a sub-site that holds a secondary volume that stores, by remote copy, a copy of the host data stored in the primary volume. The sub-site holds a journal volume that temporarily stores, as journal data, data to be subjected to the remote copy from the primary volume to the secondary volume. In the storage system, the main site has one or multiple nodes having a processor, a memory, and a non-volatile storage medium, and the sub-site has multiple nodes having a processor, a memory, and a non-volatile storage medium. In addition, in the case of creating a new secondary volume and a new journal volume in the sub-site, a management program that operates in any node or a predetermined management apparatus predicts, regarding the new secondary volume, a load of data processing by the processor under an operation condition in which redundancy processing is executed in the sub-site, predicts, regarding the new journal volume, the load under an operation condition in which redundancy processing is not executed in the sub-site, and selects a node that becomes the deployment destination of the new secondary volume and the new journal volume on the basis of the result of the prediction of the load.

Furthermore, one of representative management methods for a storage system according to the present invention is a management method for a storage system including a main site that holds a primary volume that stores host data and a sub-site that holds a secondary volume that stores, by remote copy, a copy of the host data stored in the primary volume. The sub-site holds a journal volume that temporarily stores, as journal data, data to be subjected to the remote copy from the primary volume to the secondary volume. The main site has one or multiple nodes having a processor, a memory, and a non-volatile storage medium. The sub-site has multiple nodes having a processor, a memory, and a non-volatile storage medium. The management method includes, by a management program that operates in any node or a predetermined management apparatus, in a case of creating a new secondary volume and a new journal volume in the sub-site, predicting the load of data processing by the processor under an operation condition in which redundancy processing is executed in the sub-site regarding the new secondary volume, predicting the load under an operation condition in which redundancy processing is not executed in the sub-site regarding the new journal volume, and selecting a node that becomes the deployment destination of the new secondary volume and the new journal volume on the basis of the result of the prediction of the load.

According to the present invention, the influence of the new deployment of the volumes on the performance can be predicted with high accuracy. Problems, configurations, and effects other than those described above will be made apparent by the following description of an embodiment.

BRIEF DESCRIPTION OF THE DRAWINGS

FIG. 7 is a diagram illustrating one example of a system configuration management table;

FIG. 8 is a diagram (first diagram) illustrating one example of a performance information management table;

FIG. 9 is a diagram (second diagram) illustrating one example of the performance information management table;

FIG. 10 is a diagram illustrating one example of a pair configuration management table;

DETAILED DESCRIPTION OF THE PREFERRED EMBODIMENT

Figure 1:
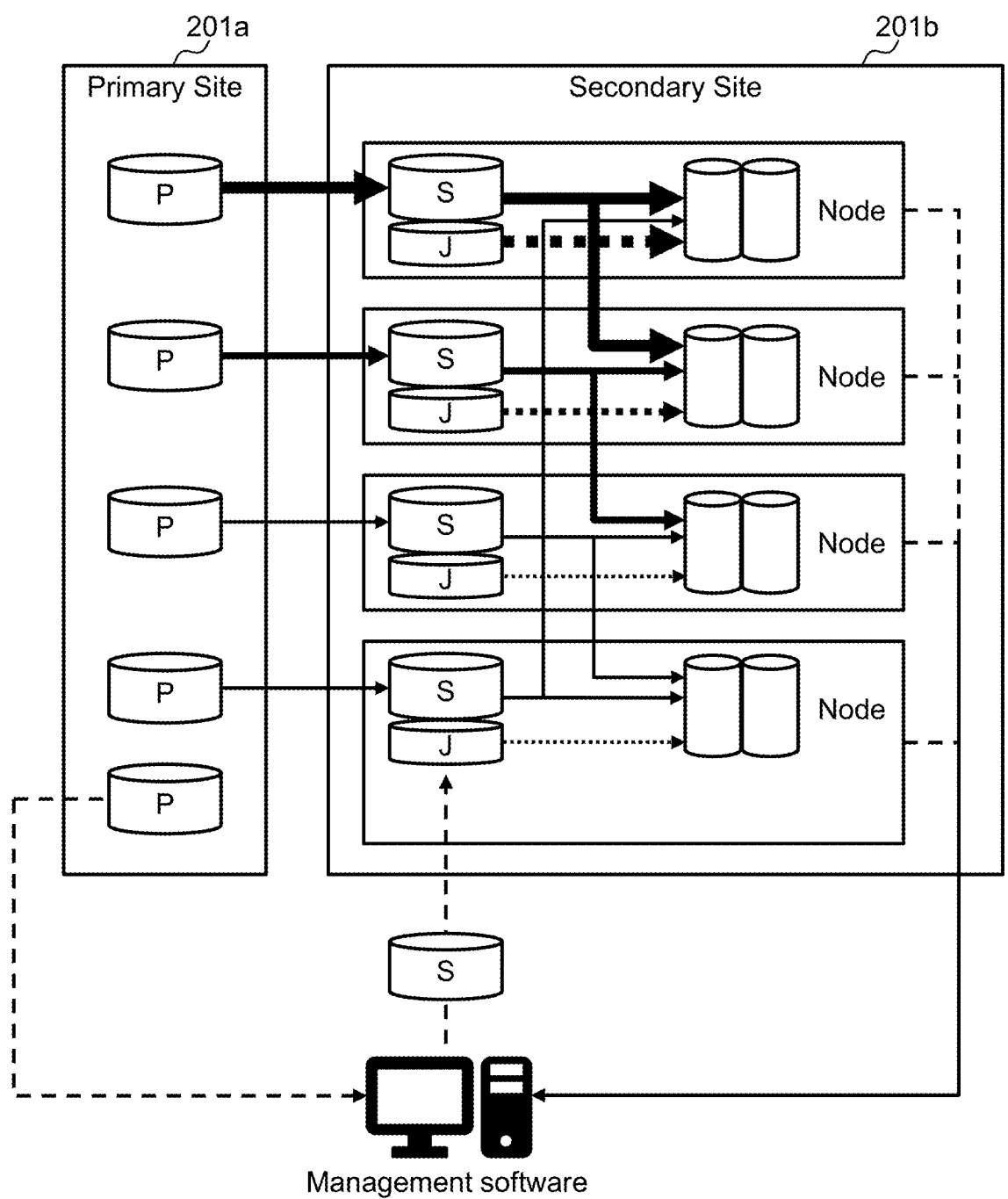
FIG. 1 is an explanatory diagram of selection of the deployment destination of volumes.

An embodiment will be described below with use of the drawings.

In the following description, it suffices for an "interface apparatus" to be one or more communication interface devices. The one or more communication interface devices may be one or more communication interface devices of the same type (for example, one or more network interface cards (NICs)), or may be two or more communication interface devices of different types (for example, NIC and host bus adapter (HBA)).

Furthermore, in the following description, a "memory" is one or more memory devices as one example of one or more storage devices, and typically it suffices for the "memory" to be a main storage device. At least one memory device in the memory may be either a volatile memory device or a non-volatile memory device.

Furthermore, in the following description, it suffices for a "persistent storage apparatus" to be one or more persistent storage devices as one example of one or more storage devices. Typically, it suffices for the persistent storage device to be a non-volatile storage device (for example, auxiliary storage device). Specifically, it suffices for the persistent storage device to be, for example, a hard disk drive (HDD), a solid state drive (SSD), or a non-volatile memory express (NVMe) drive.

Moreover, in the following description, it suffices for a "processor" to be one or more processor devices. Typically, it suffices for at least one processor device to be a microprocessor device such as a central processing unit (CPU). However, at least one processor device may be another kind of processor device such as a graphics processing unit (GPU). At least one processor device may be either a single core or multicore processor. At least one processor device may be a processor core. At least one processor device may be a processor device in a broad sense, such as a hardware circuit that executes part or all of processing (for example, field-programmable gate array (FPGA), complex programmable logic device (CPLD), or application specific integrated circuit (ASIC)).

Furthermore, in the following description, information from which an output is obtained with respect to an input will be often described with an expression such as a "xxx table." This information may be data with any structure (for example, may be either structured data or unstructured data), or may be a learning model typified by a neural network, a genetic algorithm, and a random forest that generate an output with respect to an input. Therefore, the "xxx table" can be referred to as "xxx information." Moreover, in the following description, the configuration of each table is one example. One table may be divided into two or more tables, and all or part of two or more tables may be one table.

Furthermore, in the following description, processing will be often explained with use of a "program" as the subject of a sentence. However, the program executes given processing while using a storage apparatus and/or an interface apparatus and the like as appropriate by being executed by a processor. Therefore, a processor (or device like a controller having the processor) may be employed as the subject of a sentence relating to processing. The program may be installed in an apparatus such as a calculator from a program source. For example, the program source may be a (for example, non-transitory) recording medium that can be read by a program distribution server or a calculator. Moreover, in the following description, two or more programs may be implemented as one program, and one program may be implemented as two or more programs.

Furthermore, in the following description, a common part in a reference numeral is often used in the case of describing elements of the same kind without discrimination therebetween, and a reference numeral or an identifier of an element is often used in the case of describing elements of the same kind with discrimination therebetween. For example, regarding the PVOL, a reference numeral like "PVOL 102P1" is used in some cases, and an identifier like "PVOL 1" is used in other cases.

First Embodiment

FIG. 1 is an explanatory diagram of selection of the deployment destination of volumes.

In FIG. 1, a main site 201a and a sub-site 201b are illustrated.

The main site 201a is a site that holds a plurality of primary volumes that store host data. The main site is referred to also as the primary site.

The sub-site 201b is a site that holds a secondary volume that stores, by remote copy, a copy of the host data stored in the primary volume, and holds a journal volume that temporarily stores, as journal data, data to be subjected to the remote copy from the primary volume to the secondary volume. The sub-site is referred to also as the secondary site.

The main site 201a has one or multiple nodes having a processor, a memory, and a non-volatile storage medium. The sub-site 201b has multiple nodes having a processor, a memory, and a non-volatile storage medium.

In FIG. 1, the sub-site 201b has four nodes. The main site 201a has four PVOLs and the four nodes of the sub-site 201b each have an SVOL corresponding to any of the four PVOLS. Moreover, the sub-site 201b has JVOLS corresponding to the SVOLs.

Each node of the secondary site 201*b* creates the SVOL and the JVOL of the node itself by using a drive that is the non-volatile storage medium of the node itself.

Each node of the sub-site 201*b* can allow the SVOL of the node itself to be made redundant and be deployed in another node.

Each node of the sub-site 201*b* does not make the JVOL of the node itself redundant.

A management program that manages the storage system can operate in any node in the main site or the sub-site, for example. Alternatively, a predetermined management apparatus may be disposed and execute the management program.

The management program collects data flow rate information of the PVOL of the primary site 201*a* and load information and node configuration information of each node of the sub-site 201*b*.

In the case of creating a new volume in the sub-site 201*b*, the management program calculates the influence of the new volume on the performance by using the data flow rate information of the PVOL and the load information and the node configuration information of each node of the sub-site 201*b*, and decides which node to employ as the deployment destination of the new volume on the basis of the calculation result.

When calculating the influence on the performance, the management program predicts the load under an operation condition in which redundancy processing is executed in the sub-site 201*b* regarding a new secondary volume, and predicts the load under an operation condition in which redundancy processing is not executed in the sub-site 201*b* regarding a new journal volume. Then, the management program selects the node that becomes the deployment destination of the new volume on the basis of the result of the prediction of the load.

Here, description will be made about the reason why the redundancy processing does not need to be executed for the journal volume of the sub-site and making only data of the secondary volume redundant is allowed. Journal data of the main site and journal data of the sub-site are the same. By executing copy from the primary volume to the secondary volume by using the journal data, the contents of the two volumes are synchronized. Even when the journal volume of the sub-site is not made redundant, the data before being copied to the secondary volume can be restored as long as the journal data of the main site can be used. Omission of making the journal data redundant can be implemented by the following processing. Data of the journal volume of the main site is continued to be held until data of the primary volume is destaged to the secondary volume of the sub-site. Then, the sub-site notifies the main site of the completion of the destage to the secondary volume, with the data destage to the secondary volume being the trigger. Upon the notification, the main site discards the journal data. Therefore, it is possible to avoid loss of the journal data due to failure in the sub-site even when making the journal data redundant is omitted. Note that, in the case in which the journal data of the sub-site is lost due to failure in the sub-site, restoration is enabled by executing processing of resynchronization with the secondary volume of the sub-site by use of data of the primary volume and the journal volume of the main site.

Figure 2:
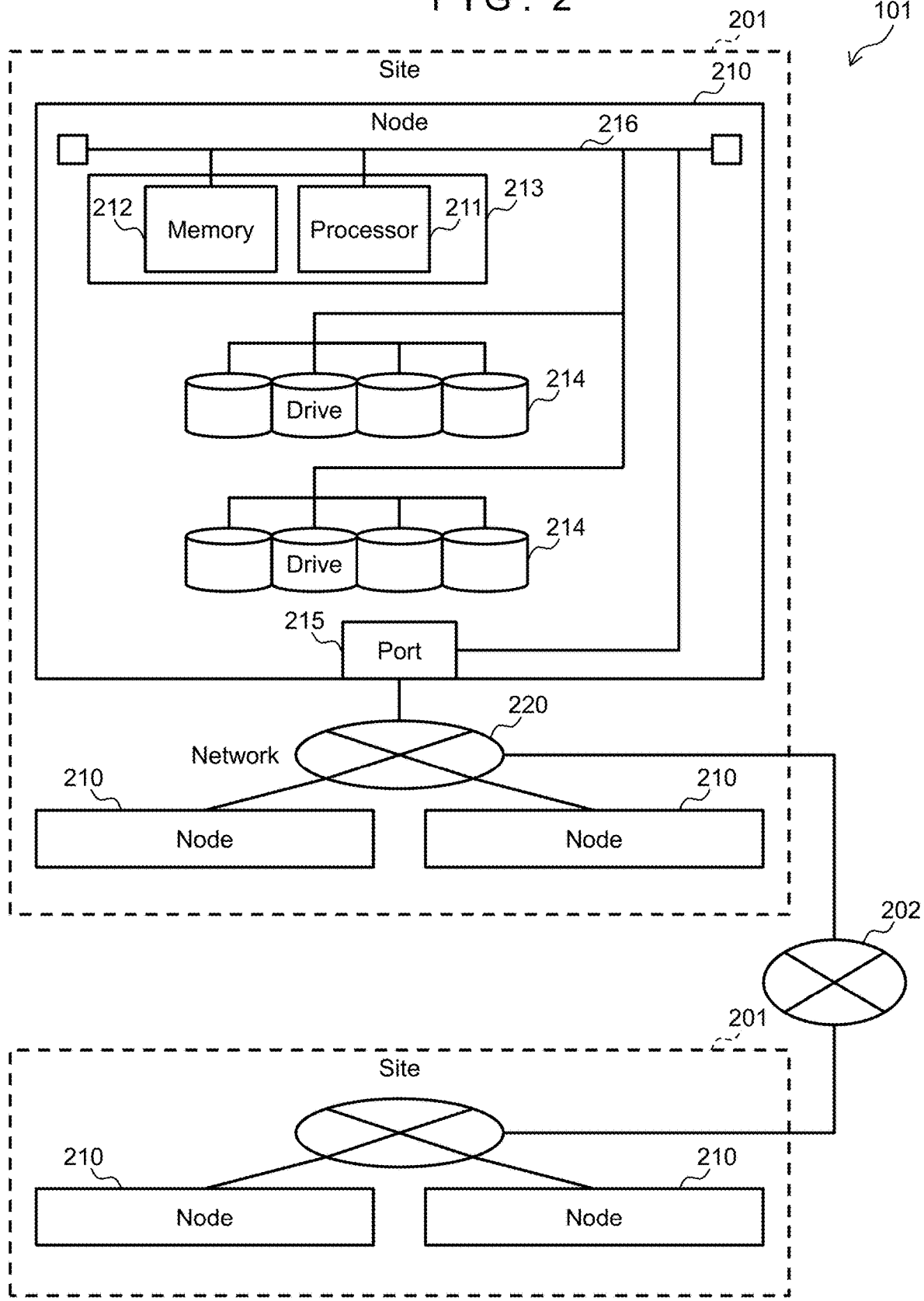
FIG. 2 is a diagram illustrating a physical configuration example of a storage system.

FIG. 2 is a diagram illustrating a physical configuration example of a storage system 101. As illustrated in FIG. 2, one or more sites 201 may be disposed in the storage system 101.

The respective sites 201 are communicably connected through a network 202. The network 202 is, for example, a wide area network (WAN) but is not limited to the WAN. The site 201 is a data center or the like and includes one or more nodes 210.

The node 210 may include a configuration of a general server calculator. For example, the node 210 includes one or more processor packages 213 including a processor 211, a memory 212, and so forth, one or more drives 214, and one or more ports 215. These respective constituent elements are connected with each other through an internal bus 216.

The processor 211 is, for example, a central processing unit (CPU) and executes various kinds of processing.

The memory 212 stores information for control necessary for implementing functions of the node 210 and stores data. Furthermore, the memory 212 stores a program to be executed by the processor 211, for example. The memory 212 may be either a volatile dynamic random access memory (DRAM) or a non-volatile storage class memory (SCM), or may be another storage device.

The drive 214 stores various kinds of data, programs, and the like. The drive 214 may be a hard disk drive (HDD) or solid state drive (SSD) connected by serial attached SCSI (SAS) or serial advanced technology attachment (SATA), or an SSD or SCM connected by non-volatile memory express (NVMe). Besides them, the drive 214 may be a drive box equipped with a plurality of HDDs or SSDs, or the like. The drive 214 is one example of the storage device.

The port 215 is connected to a network 220 and communicably connects the node of this port 215 to the other nodes 210 in the site 201 through the network 220. The network 220 is, for example, a local area network (LAN) but is not limited to the LAN.

Note that the physical configuration relating to the storage system 101 is not limited to the above-described contents. For example, the networks 202 and 220 may be made redundant. Moreover, for example, the network 220 may be separated into a network for management and a network for the storage. The connection standard thereof may be the Ethernet (registered trademark), Infiniband, or a wireless standard. The connection topology thereof is also not limited to the configuration illustrated in FIG. 2. Furthermore, for example, the drive 214 may be a configuration independent of the node 210.

Figure 3:
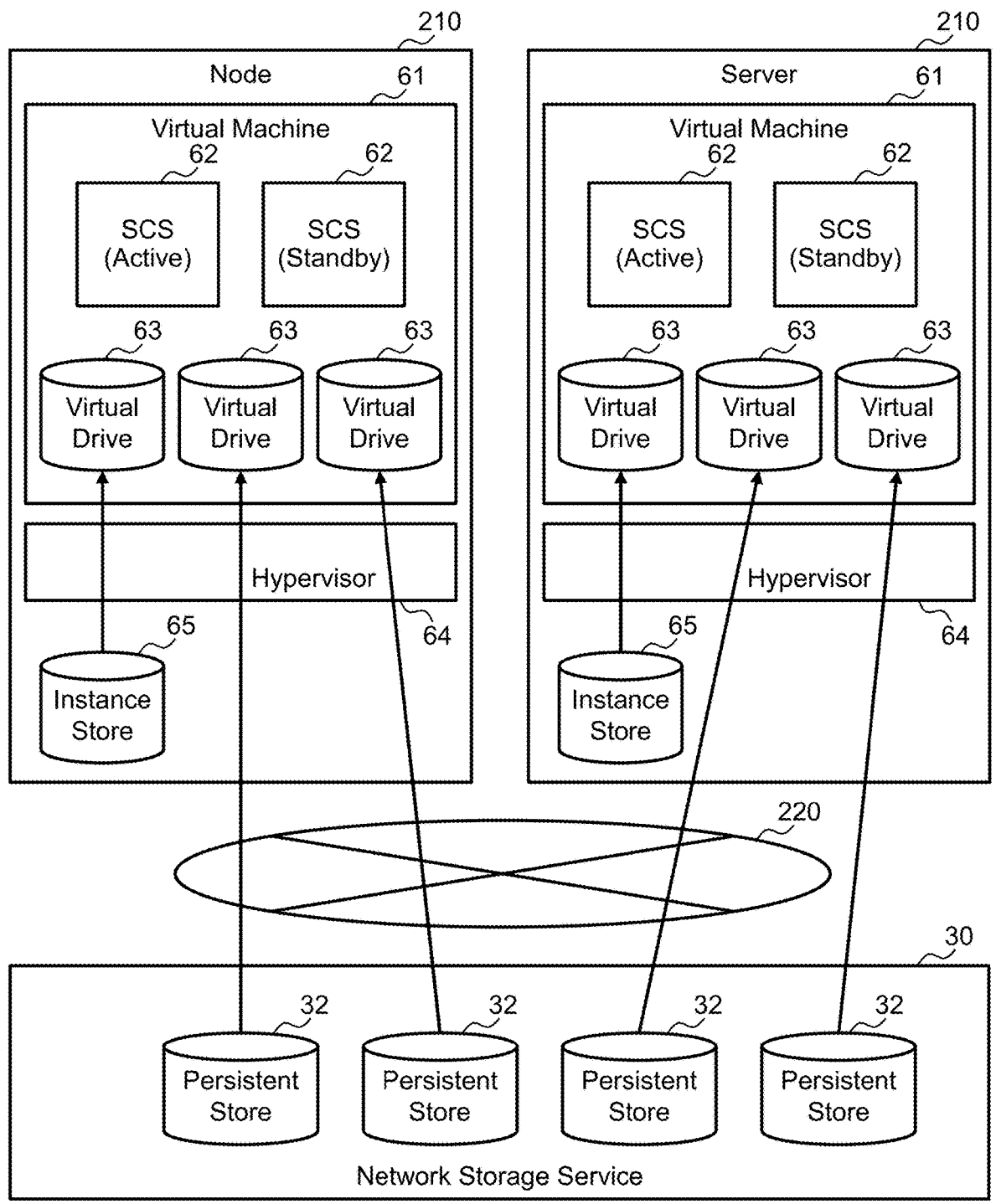
FIG. 3 is a diagram illustrating a configuration example of a software platform of a site.

FIG. 3 is a diagram illustrating a configuration example of a software platform of the site 201.

For example, a software platform having the configuration exemplified in FIG. 3 can be employed for the site 201 as a sub-site. The site 201 includes a network storage service 30 that provides a plurality of persistent stores 32 to a plurality of nodes 210 via the network 220. The persistent store 32 is a storage area based on one or more drives 214. The persistent store 32 is a non-volatile storage medium in which data does not volatilize even when failure has occurred in the network storage service 30.

The nodes 210 each have an instance store 65, a hypervisor 64, and a virtual machine 61.

The instance store 65 provides a temporary block-level storage for instances. This storage may exist on the drive 214 physically attached to the node 210. The instance store 65 is a volatile medium in which data volatilizes when power to the node 210 is interrupted.

The hypervisor 64 dynamically generates and deletes the virtual machine 61.

The virtual machine 61 manages one or more virtual drives 63 and executes storage control software (SCS) 62.

The SCS 62 controls input/output (I/O) to/from the virtual drive 63. The storage control software 62 is made redundant between the nodes 210. That is, when failure has occurred in the node 210, instead of the SCS (Active) 62 of the node 210, the SCS (Standby) 62 of another node 210 becomes Active from Standby.

The virtual drive 63 is a storage area to which the instance store 65 or the persistent store 32 is assigned. The virtual drive 63 may be treated as a VOL 102.

As above, in the site 201, the instance stores 65 based on direct attached storage (DAS) and the storage (network storage service 30) via the network 220 of iSCSI or the like are used. The hypervisor 64 may be absent. For example, DAS and the network storage service 30 may be configured in a bare metal manner.

Figure 4:
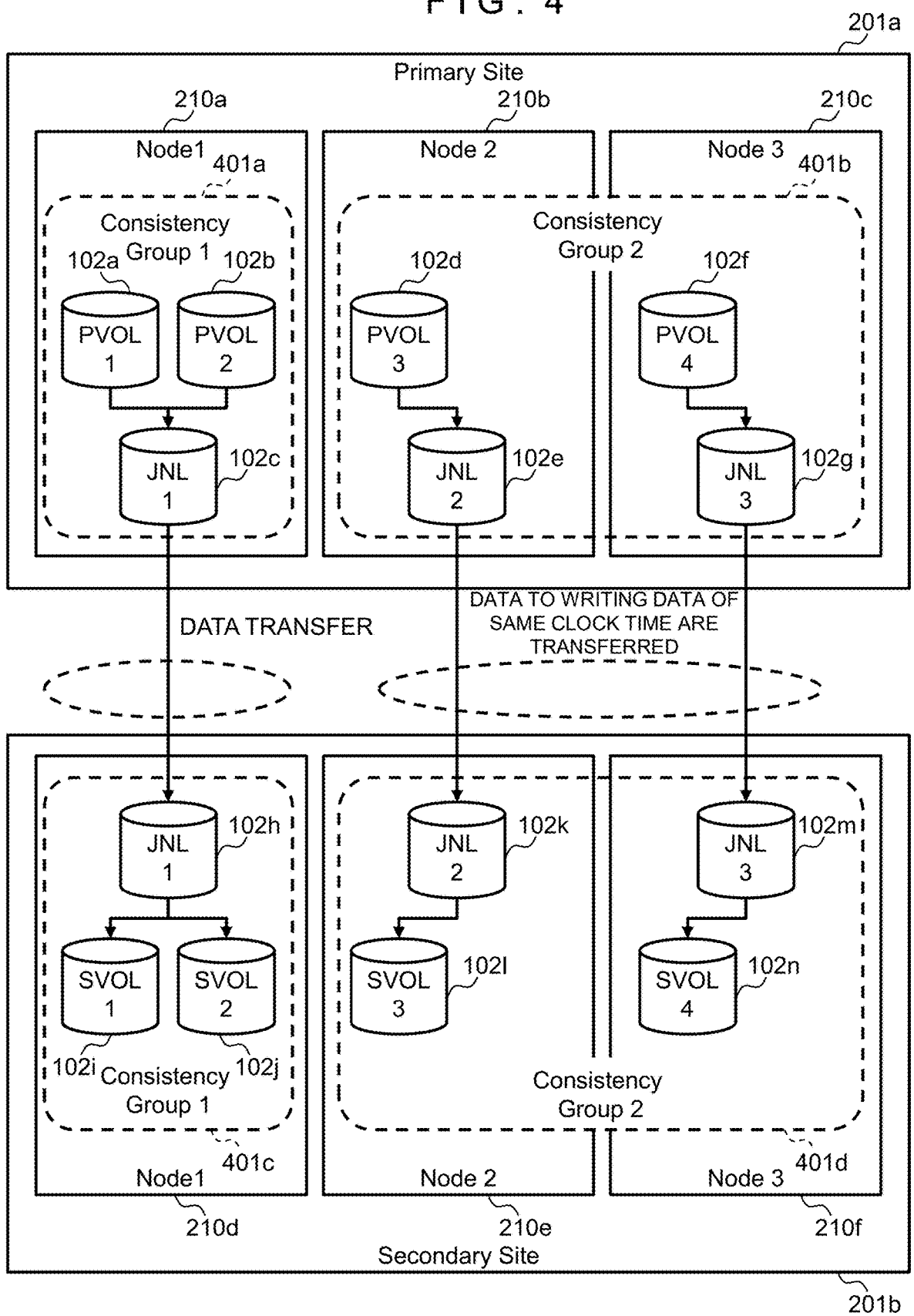
FIG. 4 is an image diagram illustrating the outline of a remote copy configuration in the storage system.

FIG. 4 is an image diagram illustrating the outline of a remote copy configuration in the storage system 101. Specifically, FIG. 4 illustrates an outline when remote copy pairs are constructed between a plurality of volumes between the main site 201a and the sub-site 201b in the storage system 101.

In the case of FIG. 4, two consistency groups 401a and 401b are constructed between the main site 201a and the sub-site 201b. The consistency group is configured by volumes of a plurality of remote copy pairs, and a plurality of volumes of the main site in the consistency group are copied into the sub-site in the state in which consistency is kept. Specifically, regarding a plurality of volumes 102 in the consistency group 401, update differential data until the same clock time is copied into the sub-site 201b. Moreover, control of the consistency group (consistency control) is managed by a journal volume (JNL). In the journal volume, the update differential data of a plurality of PVOLs is stored together with metadata of the writing clock time thereof and the like. When transferring data of the PVOLs to the sub-site 201b, the storage cluster of the main site 201a transfers, to the sub-site 201b, the update differential data until the same clock time from among the update differential data of the plurality of PVOLs written to the journal volume. This allows copy into SVOLs of the sub-site 201b in the state in which the consistency of the updating clock time between the plurality of PVOLS is kept.

Specifically, in the configuration illustrated in FIG. 4, for the consistency group 401a, data is copied into volumes 102i and 102j existing in a node 210d of the sub-site 201b (that is, SVOLs 1021 and 102j of a consistency group 401c) in the state in which the consistency between volumes 102a and 102b existing in a node 210a of the main site 201a is kept. For the consistency group 401b, data is copied into a volume 1021 existing in a node 210e of the sub-site 201b and a volume 102n existing in a node 210f (that is, SVOLs 1021 and 102n of a consistency group 401d) in the state in which the consistency between a volume 102d existing in a node 210b of the main site 201a and a volume 102f existing in a node 210c is kept.

As is understood from the above-described specific configuration, the consistency group 401 may be configured by volumes in a specific node in a site or may be configured by volumes existing in a plurality of nodes in a site.

Furthermore, although not illustrated, a remote copy pair may be constructed by directly associating the PVOL with the SVOL without the journal volume in the storage system 101. In this case, the update differential data of the PVOL is directly transferred to the node having the SVOL without passing through the journal volume and is written to the SVOL. When the PVOL and the SVOL are directly paired as above, the update differential data of the PVOL can be reflected in the SVOL at a high speed because the journal volume is not interposed in the reflection of the update differential data from the PVOL to the SVOL. Thus, this direct pairing is useful in the case of executing remote copy synchronously with I/O processing from a host. On the other hand, when the PVOL and the SVOL are directly paired, consistency control such as reflecting the update differential data until the same clock time in the SVOL is impossible because the journal volume is absent.

Figure 5:
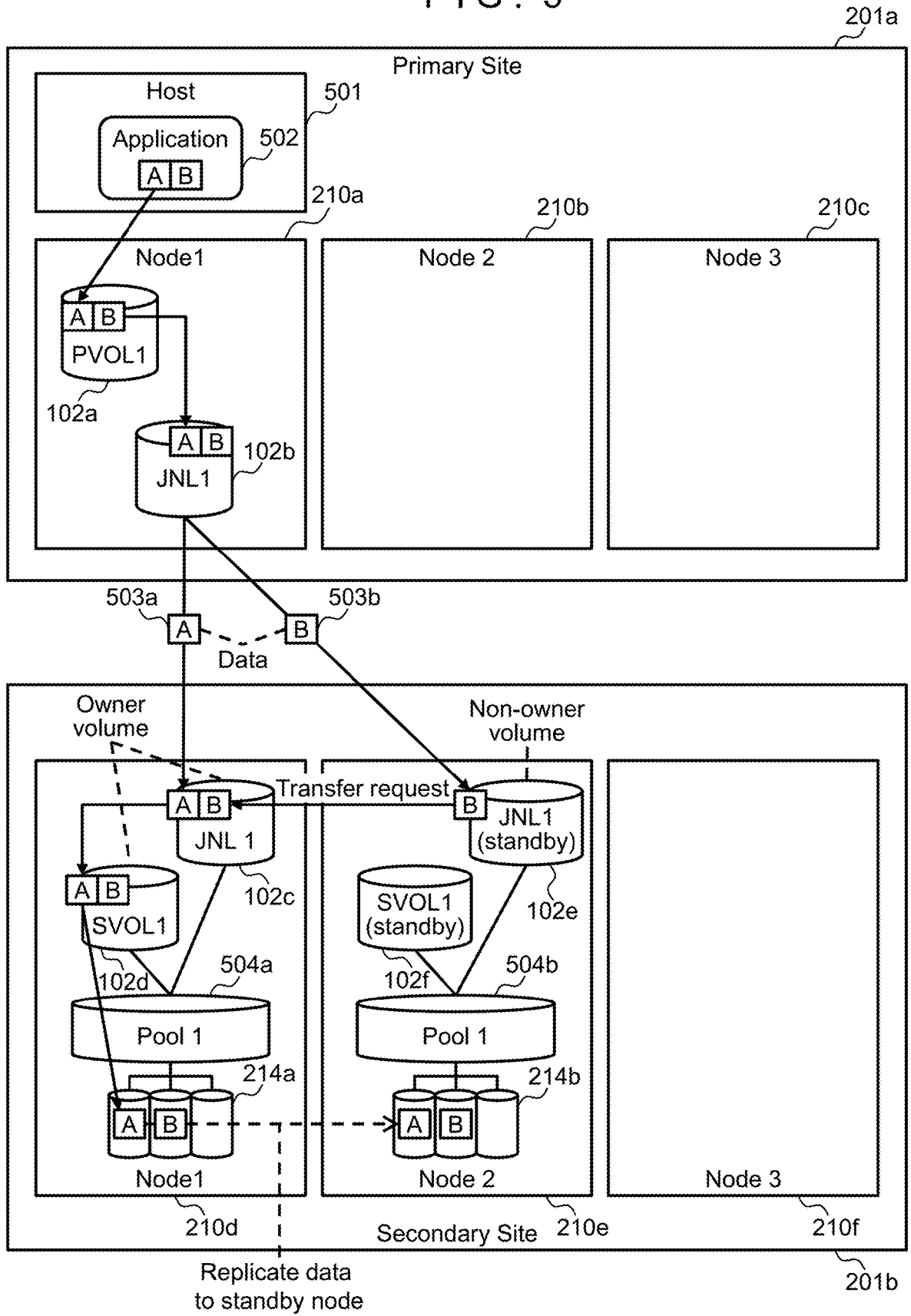
FIG. 5 is an image diagram illustrating the outline of I/O request processing in the storage system.

FIG. 5 is an image diagram illustrating the outline of I/O request processing in the storage system 101. Specifically, FIG. 5 illustrates the outline of I/O processing in the state in which a remote copy pair is constructed between the PVOL 102a of the main site 201a and the SVOL 102d of the sub-site 201b in the storage system 101.

First, an application 502 that operates on a host 501 issues a writing request to the node 210a so as to write data 503a (data A) and data 503b (data B) to the PVOL 102a. The node 210a that has received the writing request writes the data A and the data B to the PVOL 102a and writes the data A and the data B to the journal volume 102b (JNL 1) as update differential data.

Next, the node 210a transfers the update differential data written to the journal volume 102b to journal volumes 102c and 102e of the sub-site 201b. At this time, when a plurality of communication paths have been established between the main site 201a and the sub-site 201b, the data may be transferred by using any communication path. In general, the node 210a of the main site 201a transfers the update differential data to the node 210d having the ownership of the SVOL 102d paired with the PVOL 102a. However, when failure has occurred in the communication path having the ownership, the update differential data may be transferred to the node 210e or the like that does not have the ownership. For example, when the node 210a of the main site 201a has transferred the update differential data to the node 210e that does not have the ownership in the sub-site 201b, the node 210e of the sub-site 201b transfers the received update differential data to the node 210d with the ownership, and the node 210d writes the transferred update differential data to the journal volume 102c.

Next, the node 210a periodically writes, to the SVOL 102d, the update differential data written to the journal volume 102c of the sub-site 201b. Then, the data 503a (data A) and the data 503b (data B) written to the SVOL 102d are written to a drive 214a via a storage pool 504a. When the configuration of the drive 214a is direct attached storage (DAS) in which the node (server) and the drive are connected in a one-to-one relationship, the data are written to a local drive (drive 214a) mounted in the node 210d. In this manner, the data written to the SVOL 102d are all written to the drive 214a of the node 210d with the ownership of the SVOL 102d. This eliminates the need to read out the data from another node when the data are read out from the SVOL 102d later. This allows the storage system 101 to exclude inter-node transfer processing and implement high-speed readout processing.

Note that, in the storage pool 504 (for example, storage pool 504a), storage functions such as Thin-provisioning, compression, and deduplication are provided, and processing of the storage function necessary for the written data is executed. Furthermore, in order to protect the data from node failure in the writing thereof to the drive 214a, the storage system 101 writes redundant data of the data to be written (data A and B) also to a drive 214b of another node (for example, node 210e that is a standby node). Regarding the writing of the redundant data, when the data protection policy is replication, the storage system 101 writes, to the drive 214b, a replica of the data to be written as the redundant data. On the other hand, when the data protection policy is Erasure Coding, the storage system 101 calculates parity from the data to be written and writes the computed parity to the drive 214b as the redundant data.

Moreover, although illustration of the internal configuration is omitted regarding the nodes 210b, 210c, and 210f in FIG. 5, these respective nodes 210 may also have the PVOL and the SVOL and process I/O from the host 501 similarly to the above-described nodes 210a, 210d, and 210e.

Furthermore, the flow of the I/O processing illustrated in FIG. 5 is one example of push-type I/O processing in which data is distributed from the main site 201a to the sub-site 201b. However, it is also possible for the storage system 101 to execute pull-type I/O processing in which the sub-site 201b accesses the main site 201a to read data.

Figure 6:
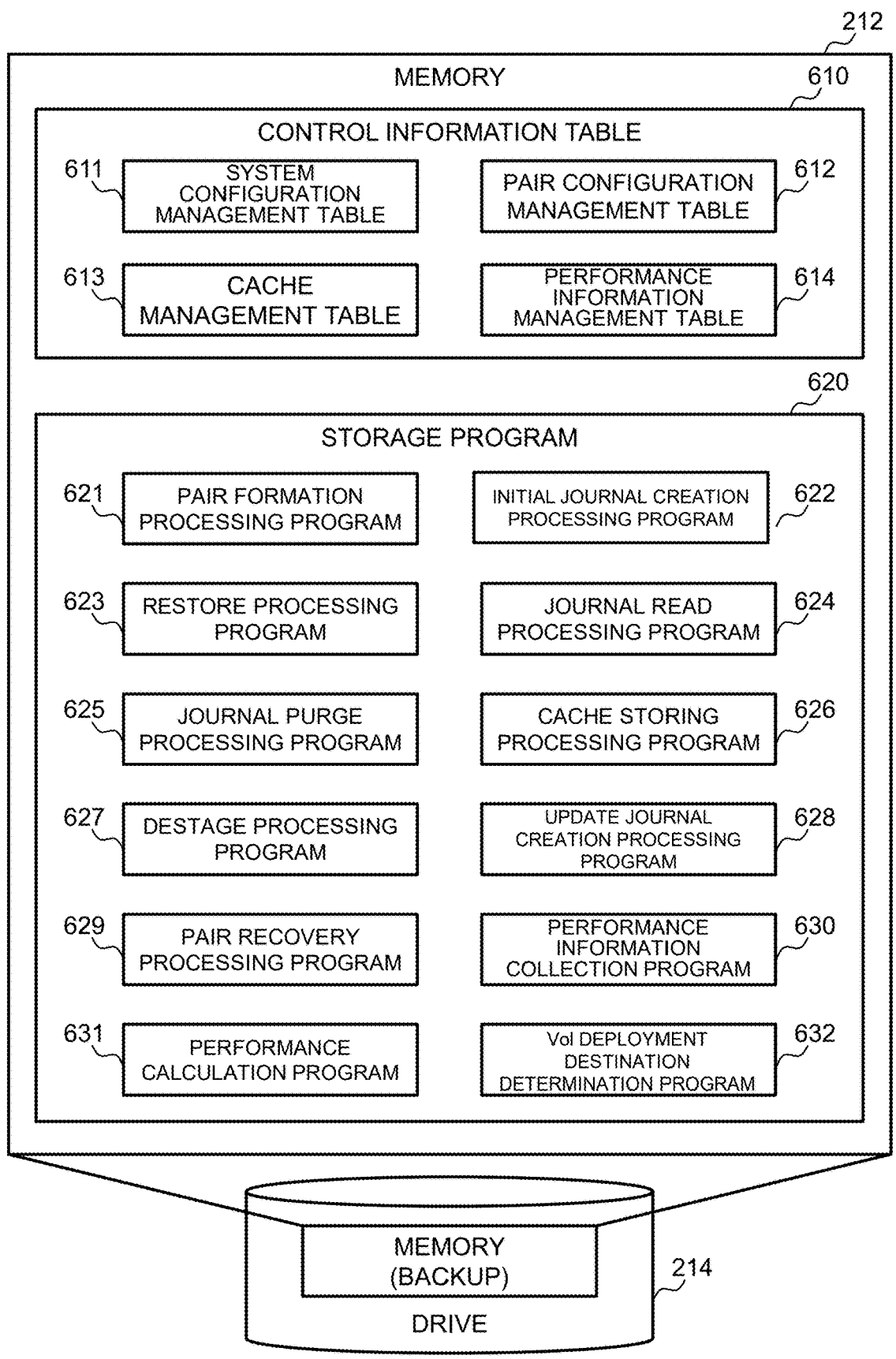
FIG. 6 is a diagram illustrating one example of data and programs held in a memory.

FIG. 6 is a diagram illustrating one example of data and programs held in the memory 212.

Information is read out from the drive 214 into the memory 212. For example, various tables included in a control information table 610 and various programs included in the SCS 262 are loaded on the memory 212 during execution of processing in which the table or program itself is used. In the other situations, they are stored in a non-volatile storage area such as the drive 214 in preparation for power failure and the like.

The control information table 610 includes a system configuration management table 611, a pair configuration management table 612, a cache management table 613, and a performance information management table 614.

A storage program 620 includes a pair formation processing program 621, an initial journal creation processing program 622, a restore processing program 623, a journal read processing program 624, a journal purge processing program 625, a cache storing processing program 626, a destage processing program 627, an update journal creation processing program 628, a pair recovery processing program 629, a performance information collection program 630, a performance calculation program 631, and a volume deployment destination determination program 632.

The storage program 620 implements functions as a management program that manages the storage system by using operation of the performance information collection program 630, the performance calculation program 631, and the volume deployment destination determination program 632.

Each program configuring the storage program 620 is one example of a program used when various functions of the node 210 are implemented by software (storage control software 62). Specifically, the processor 211 reads out these programs stored in the drive 214 into the memory 212 and executes them, and thereby the functions are implemented. Note that, in the storage system 101 according to the present embodiment, various functions of the node 210 may be implemented by hardware such as a dedicated circuit having functions equivalent to the above-described respective programs or may be implemented through a combination of software and hardware. Moreover, part of various functions of the node 210 may be implemented by another computer that can communicate with the node 210.

FIG. 7 is a diagram illustrating one example of the system configuration management table 611. The system configuration management table 611 stores information for managing the configuration of the node 210, the drive 214, and the port 215 in the site 201.

The system configuration management table 611 includes a node configuration management table 710, a drive configuration management table 720, a port configuration management table 730, and a volume configuration management table 740. Note that the storage system 101 manages, regarding each site 201, the node configuration management table 710 regarding the plurality of nodes 210 existing in each site 210, and the node 210 manages the drive configuration management table 720, the port configuration management table 730, and the volume configuration management table 740 regarding the plurality of drives 214 in this node 210 itself.

The node configuration management table 710 is set for each site 201, and stores information indicating the configuration relating to the nodes 210 disposed in the site 201 (relationship between the nodes 210 and the drives 214 and the like). More specifically, the node configuration management table 710 stores information in which a node ID 711, a state 712, a drive ID list 713, a port ID list 714, and data protection 715 are associated with each other.

The node ID 711 is identification information that allows identification of the node 210. The state 712 is state information indicating the state of the node 210 (for example, NORMAL, WARNING, FAILURE, or the like). The drive ID list 713 is identification information that allows identification of the drives 214 disposed in the node 210. The port ID list 714 is identification information that allows identification of the ports 215 disposed in the node 210. The data protection 715 indicates the system of protection of redundant data, such as "mirror" and "distributed parity."

The drive configuration management table 720 is set for each node 210, and stores information indicating the configuration relating to the drives 214 disposed in the node 210. More specifically, the drive configuration management table 720 stores information in which a drive ID 721, a state 722, and a size 723 are associated with each other.

The drive ID 721 is identification information that allows identification of the drive 214. The state 722 is state information indicating the state of the drive 214 (for example, NORMAL, WARNING, FAILURE, or the like). The size 723 is information indicating the capacity of the drive 214 (for example, terabyte (TB) or gigabyte (GB)).

The port configuration management table 730 is set for each node 210, and stores information indicating the configuration relating to the ports 215 disposed in the node 210. More specifically, the port configuration management table 730 stores information in which a port ID 731, a state 732, and an address 733 are associated with each other.

The port ID 731 is identification information that allows identification of the port 215. The state 732 is state information indicating the state of the port 215 (for example, NORMAL, WARNING, FAILURE, or the like). The address 733 is information indicating an address (identification information) assigned to the port 215 on a network. The form of the address may be the Internet Protocol (IP) or may be the World Wide Name (WWN), a Media Access Control (MAC) address, or the like.

The volume configuration management table 740 is set for each node 210, and stores information indicating the configuration relating to volumes. More specifically, the volume configuration management table 740 stores information in which a volume ID 741, a state 742, a size 743, data deletion 744 and journal setting 745 are associated with each other.

The volume ID 741 is identification information to uniquely identify the volume created in the node 210. The state 742 is state information indicating the state of the volume (for example, Normal, Failure). The size 743 is information indicating the size of the volume (for example, terabyte (TB) or gigabyte (GB)). The data deletion 744 indicates the setting relating to data deletion of the volume (for example, invalid, compression, and compression+deduplication). The journal setting 745 indicates whether or not to apply a setting as the journal volume.

FIGS. 8 and 9 are diagrams illustrating one example of the performance information management table 614. The performance information management table 614 includes a maximum performance information management table 614a and a performance history information management table 614b.

The maximum performance information management table 614a indicates the maximum performance of the CPU, the drive, and the port.

The management program inquires of each node and collects the maximum performance information held by the node to manage the information as the maximum performance information management table 614a and use it for computation of the limit performance of the node. The maximum performance information management table 614a is loaded on the memory as data of a table format or a list format. However, the format thereof is not limited.

The maximum performance information management table 614a includes a CPU information management table 810, a drive performance information management table 820, and a port performance information management table 830.

The CPU information management table 810 stores information in which a node ID 811, a CPU core 812, a CPU generation 813, a CPU frequency 814, and a formation copy processing time 815 are associated with each other.

The node ID 811 is identification information that allows identification of the node 210. The CPU core 812 indicates the CPU core mounted in the node 210. The CPU generation 813 indicates generation information of the CPU. The CPU frequency 814 indicates the operating clock of the CPU. The formation copy processing time 815 indicates the time required for processing of restoring, in the secondary volume, data that has been stored in the primary volume.

The drive performance information management table 820 stores information in which a drive ID 821, a type 822, maximum throughput performance 823, and latency 824 are associated with each other.

The drive ID 821 is identification information that allows identification of the drive 214. The type 822 is information indicating the type of the drive (for example, NVMe SSD, HDD, Persistent Store, and Instance Store). The maximum throughput performance 823 indicates the maximum throughput of the drive. The latency 824 indicates the delay time of the drive.

The port performance information management table 830 stores information in which a port ID 831, an NIC bandwidth 832, and port sharing with the persistent store 833 are associated with each other.

The port ID 831 is identification information that allows identification of the port 215. The NIC bandwidth 832 is information indicating the bandwidth of the port 215 (for example, 15 Gb/s, 0.1 Gb/s, or the like). The port sharing with the persistent store 833 indicates whether or not the port is shared with the persistent store 32. When the port is shared, identification information (drive ID) of the persistent store 32 is further indicated.

For creation of the performance history information management table 614b, management software inquires of each node to collect and accumulate the performance history information held by the node. The management software uses the performance history information management table 614b for computation of the current load. There is room for discretion as to what kind of data to use. For example, there is discretion as to which of the average load in most recent one hour or the maximum load after the start of operation of the apparatus is to be checked, and the like. The performance history information management table 614b is loaded on the memory as data of a table format or a list format. However, the format thereof is not limited.

The performance history information management table 614b includes a CPU performance history information management table 910, a drive performance history information management table 920, a port performance history information management table 930, and a volume performance history information management table 940.

The CPU performance history information management table 910 stores information in which a data ID 911, a CPU core 912, a collection clock time 913, a CPU frequency 914, and CPU utilization 915 are associated with each other.

The data ID 911 is identification information that allows identification of the collected data. The CPU core 912 indicates which CPU core the data corresponds to. The collection clock time 913 indicates the clock time when the data has been collected. The CPU frequency 914 indicates which frequency the CPU core has operated at. The CPU utilization 915 indicates the utilization rate of the CPU core by percentage, for example.

The drive performance history information management table 920 stores information in which a data ID 921, a drive ID 922, a collection clock time 923, throughput 924, and latency 925 are associated with each other.

The data ID 921 is identification information that allows identification of the collected data. The drive ID 922 indicates which drive the data corresponds to. The collection clock time 923 indicates the clock time when the data has been collected. The throughput 924 indicates the throughput of the drive at the collection clock time. The latency 925 indicates the latency of the drive at the collection clock time.

The port performance history information management table 930 stores information in which a data ID 931, a port ID 932, a collection clock time 933, and throughput 934 are associated with each other.

The data ID 931 is identification information that allows identification of the collected data. The port ID 932 indicates which port the data corresponds to. The collection clock time 933 indicates the clock time when the data has been collected. The throughput 934 indicates the throughput of the port at the collection clock time.

The volume performance history information management table 940 stores information in which a data ID 941, a volume ID 942, a collection clock time 943, and throughput 944 are associated with each other.

The data ID 941 is identification information that allows identification of the collected data. The volume ID 942 indicates which volume the data corresponds to. The collection clock time 943 indicates the clock time when the data has been collected. The throughput 944 indicates the throughput of the volume at the collection clock time.

FIG. 10 is a diagram illustrating one example of the pair configuration management table 612.

The pair configuration management table 612 includes a volume management table 1010, a pair management table 1020, and a journal management table 1030.

The volume management table 1010 stores information indicating the configuration relating to the volume 102. More specifically, the volume management table 1010 stores information in which a volume ID 1011, an owner node ID 1012, a retreat destination node ID 1013, a size 1014, and an attribute 1015 are associated with each other.

The volume ID 1011 is identification information that allows identification of the volume 102. The owner node ID

1012 is information indicating the node 210 having the ownership of the volume 102. The retreat destination node ID 1013 is information indicating the node 210 that takes over processing at the time of failure of the node 210 having the ownership of the SVOL. The size 1014 is information indicating the size of the volume 102 (for example, terabyte (TB) or gigabyte (GB)). The attribute 1015 is information indicating the attribute of the volume 102, and NML_VOL (normal volume), PAIR_VOL (PAIR Volume), JNL_VOL (Journal Volume), or the like is included.

The pair management table 1020 stores information indicating the configuration relating to pairs of remote copy. More specifically, the pair management table 1020 stores information in which a pair ID 1021, a primary journal volume ID 1022, a primary volume ID 1023, a secondary journal volume ID 1024, a secondary volume ID 1025, and a state 1026 are associated with each other.

The pair ID 1021 is identification information that allows identification of the remote copy pair. The primary journal volume ID 1022 is the ID of the volume 102 in which journal information on the side of the main site 201*a* in the remote copy pair is recorded. The primary volume ID 1023 is the ID of the volume 102 that exists on the side of the main site 201*a* and is the copy source in the remote copy pair. The secondary journal volume ID 1024 is the ID of the volume 102 in which journal information on the side of the sub-site 201*b* in the remote copy pair is recorded. The secondary volume ID 1025 is the ID of the volume 102 that exists on the side of the sub-site 201*b* and is the copy destination in the remote copy pair. The state 1026 is state information indicating the state of the remote copy pair (for example, PAIR, COPY, SUSPEND, or the like). "PAIR" is the state in which writing to the PVOL is periodically reflected in the SVOL. "COPY" is the state in which initial copy is being executed. "SUSPEND" is the pair suspension state (state in which synchronization between the PVOL and the SVOL is not executed).

The journal management table 1030 stores information relating to the journal. More specifically, the journal management table 1030 stores, regarding each journal, pieces of information such as a pair group ID 1031, a journal ID 1032, a P/S volume ID 1033, a P/S volume address 1034, a size 1035, and a cache segment ID 1036.

The pair group ID 1031 is the ID of the consistency group to which the journal belongs.

The journal ID 1032 is the ID of the journal. The ID of the journal is equivalent to SEQ # and is, for example, a serial number in the consistency group. That is, the ID of the journal represents the order of writing, and the data in the journal is stored in the SVOL in the consistency group in order of the ID of the journal.

The P/S volume ID 1033 includes the ID of the PVOL to which the data in the journal is written and the ID of the SVOL to which the data in the journal is written.

The P/S volume address 1034 includes the storing destination address of the relevant data in the PVOL to which the data in the journal is written and the storing destination address of the relevant data in the SVOL to which the data in the journal is written.

The size 1035 represents the size of the journal. For example, one journal includes one or multiple data.

The cache segment ID 1036 is the ID of the cache segment to which the data in the journal is written.

Figure 11:
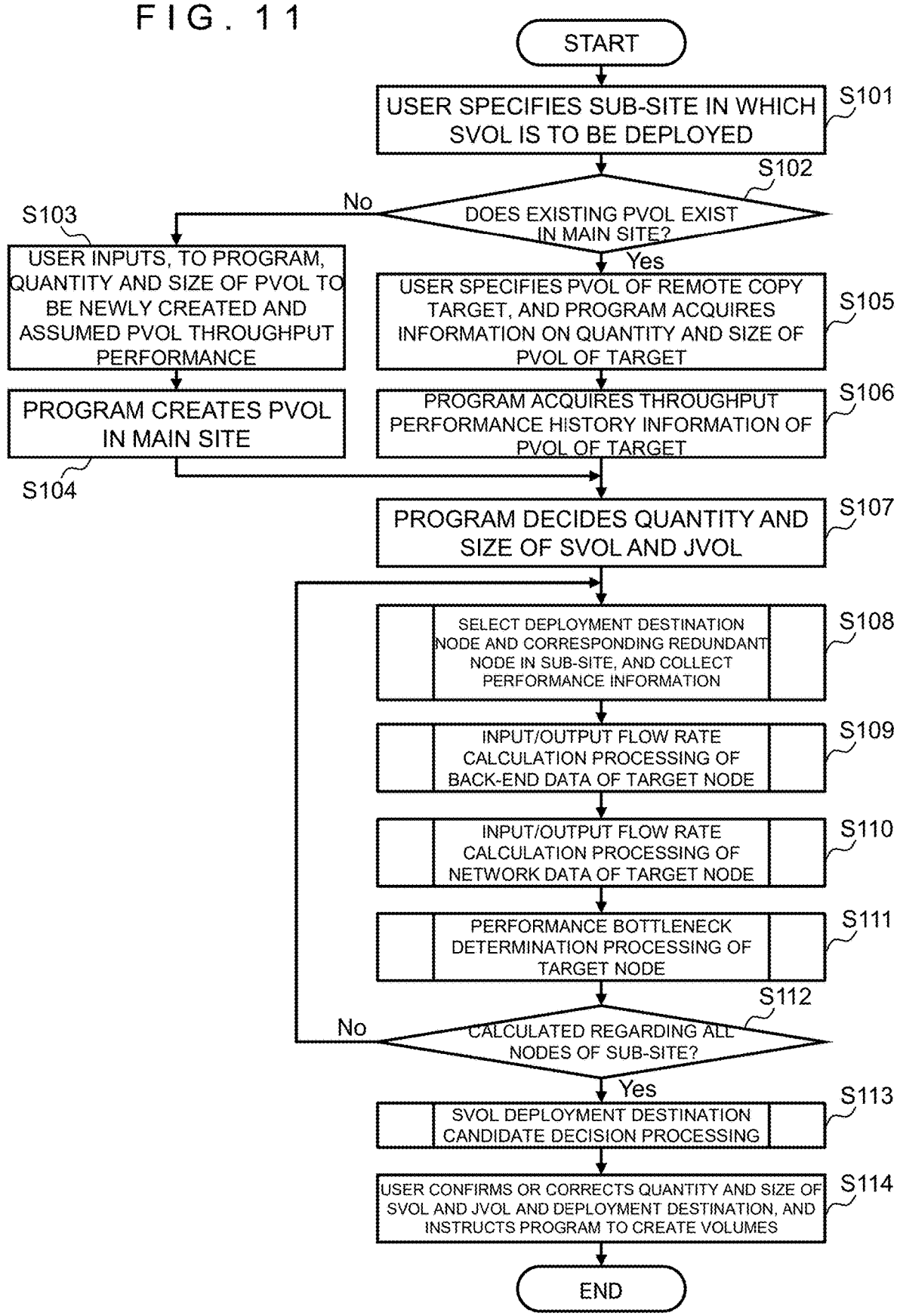
FIG. 11 is a flowchart illustrating the processing procedure of new deployment of an SVOL.

FIG. 11 is a flowchart illustrating the processing procedure of new deployment of an SVOL. In new deployment of an SVOL, the storage program 620 sequentially executes the following steps S101 to S114.

S101 The storage program 620 accepts specifying of a sub-site in which an SVOL is to be deployed from a user. Thereafter, the processing proceeds to the step S102.

S102 The storage program 620 determines whether or not an existing PVOL exists in a main site. When an existing PVOL does not exist in the main site (S102; No), that is, in the case of deploying a new PVOL and a new SVOL, the processing proceeds to S103. When an existing PVOL exists in the main site (S102; Yes), that is, in the case of deploying a new SVOL corresponding to the existing PVOL, the processing proceeds to the step S105. Note that, even when an existing PVOL exists, the processing proceeds to the step S103 in the case of deploying not an SVOL corresponding to the existing PVOL but a new PVOL and a new SVOL.

S103 The storage program 620 accepts, from the user, an input of the quantity and size of the PVOL to be newly created and the assumed PVOL throughput performance. Thereafter, the processing proceeds to the step S104.

S104 The storage program 620 creates the PVOL in the main site. Thereafter, the processing proceeds to the step S107.

S105 The storage program 620 accepts specifying of the PVOL of the remote copy target from the user, and acquires information on the quantity and size of the PVOL. Thereafter, the processing proceeds to the step S106.

S106 The storage program 620 acquires the throughput performance history information of the PVOL of the target. Thereafter, the processing proceeds to the step S107.

S107 The storage program 620 decides the quantity and size of the SVOL and the JVOL. Thereafter, the processing proceeds to the step S108.

S108 The performance information collection program 630 selects the deployment destination node and the corresponding redundant node in the sub-site, and collects the performance information. Thereafter, the processing proceeds to the step S109.

S109 The performance calculation program 631 executes input/output flow rate calculation processing of back-end data of the target node. Thereafter, the processing proceeds to the step S110.

S110 The performance calculation program 631 executes input/output flow rate calculation processing of network data of the target node. Thereafter, the processing proceeds to the step S111.

S111 The performance calculation program 631 executes performance bottleneck determination processing of the target node. Thereafter, the processing proceeds to the step S112.

S112 The performance calculation program 631 determines whether or not calculation has been executed regarding all nodes of the sub-site. When the node regarding which calculation has not been executed is left (S112; No), the processing returns to the step S108. When calculation has been executed regarding all nodes (step S112; Yes), the processing proceeds to the step S113.

S113 The volume deployment destination determination program 632 executes SVOL deployment destination candidate decision processing, and the processing proceeds to the step S114. As described in detail later, in this processing, candidates for the SVOL deployment destination are notified to the user as deployment destination nodes.

S114 The storage program 620 accepts, from the user, an input of confirmation or correction regarding the quantity and size of the SVOL and the JVOL and the deployment destination, and creates volumes.

In this manner, the storage program 620 collects the information necessary for creation and deployment of the SVOL and executes performance prediction to decide the deployment destination. The storage program 620 changes parameters used for the creation of the SVOL and the JVOL depending on whether the PVOL of the remote copy target is newly created or arises from diversion of an existing PVOL. Furthermore, the storage program 620 changes also the PVOL flow rate information used for the flow rate calculation. The throughput performance (data flow rate) of the PVOL may be input on the basis of a track record of another volume, or the user may be caused to input it. When the SVOL deployment is decided, the deployment destination of the JVOL is also settled. This is because the SVOL and the JVOL need to be set in the same node. Thus, the load attributed to the JVOL is also considered.

Figure 12:
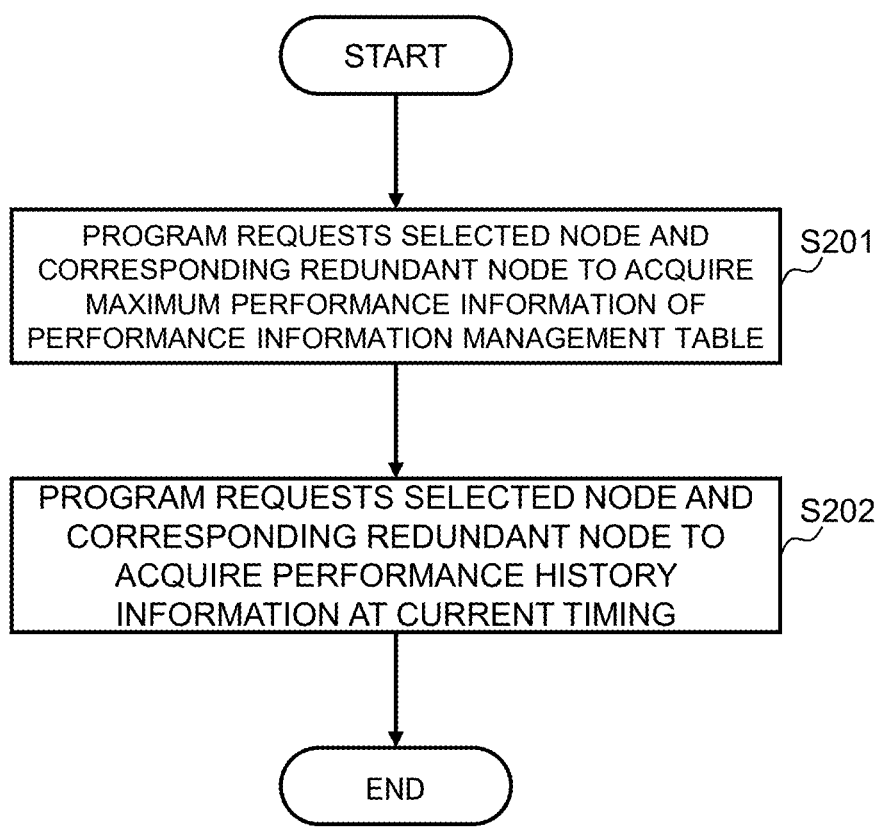
FIG. 12 is a flowchart for explaining details of performance information collection processing.

FIG. 12 is a flowchart for explaining details of the performance information collection processing (S108) illustrated in FIG. 11.

The performance information collection program 630 selects a collection destination node and requests the selected node and a corresponding redundant node to acquire maximum performance information of the maximum performance information management table 614a (step S201).

Thereafter, the performance information collection program 630 requests the selected node and the corresponding redundant node to acquire performance history information at the current timing (step S202).

Figure 13:
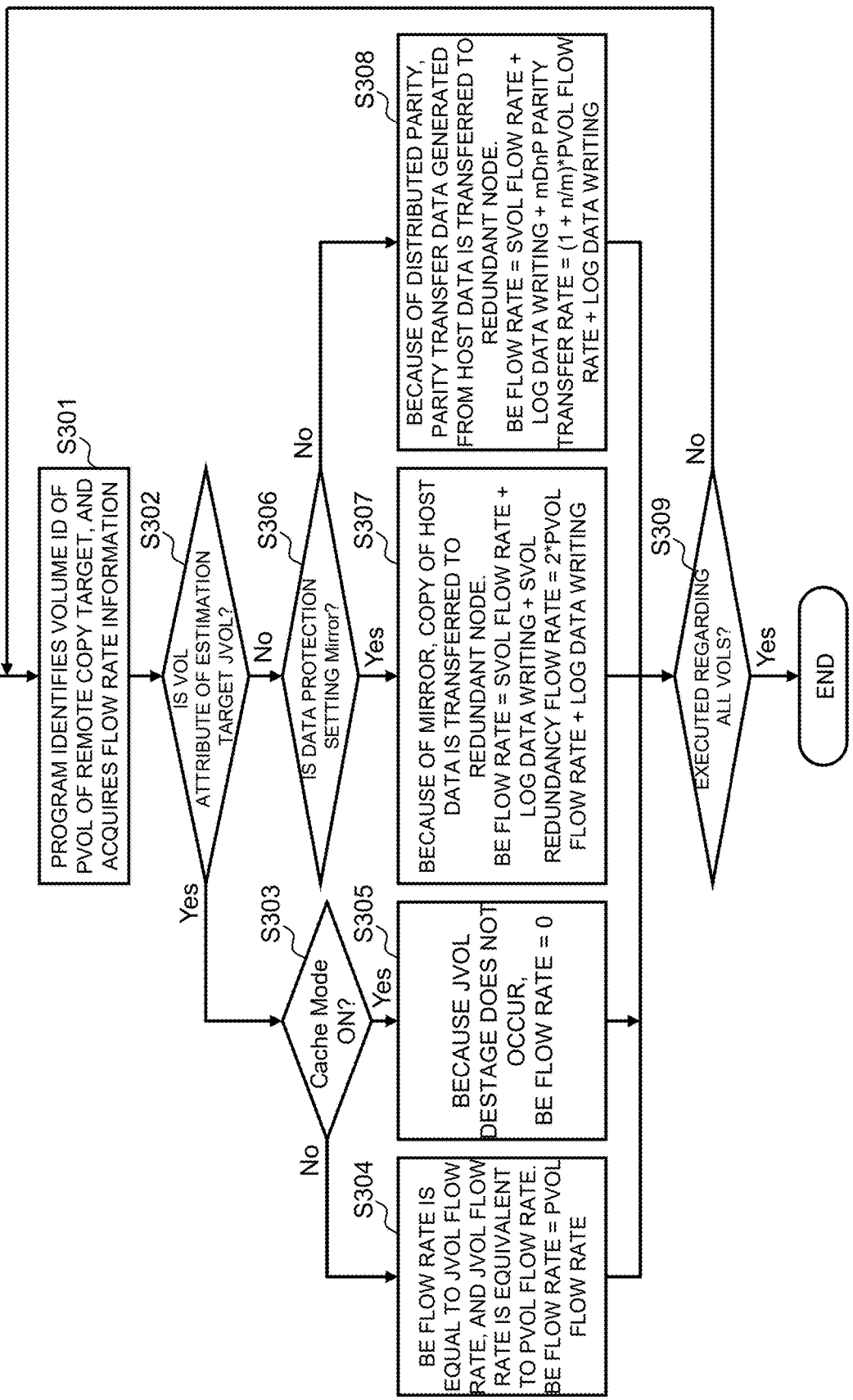
FIG. 13 is a flowchart for explaining details of input/output flow rate calculation processing of back-end data.

FIG. 13 is a flowchart for explaining details of the input/output flow rate calculation processing of back-end data (S109) illustrated in FIG. 11. In the input/output flow rate calculation processing of back-end data, the performance information collection program 630 sequentially executes the following steps S301 to S309.

S301 The performance information collection program 630 identifies the volume ID of the PVOL of the remote copy target and acquires flow rate information. Thereafter, the processing proceeds to the step S302.

S302 The performance information collection program 630 determines whether or not the volume attribute of the estimation target is the JVOL. When the volume attribute of the estimation target is the JVOL (S302; Yes), the processing proceeds to the step S303. When the volume attribute of the estimation target is not the JVOL (S302; No), the processing proceeds to the step S306.

S303 The performance information collection program 630 determines whether or not the cache mode is ON. When the cache mode is not ON (S303; No), the processing proceeds to the step S304. When the cache mode is ON (S303; Yes), the processing proceeds to the step S305.

S304 The back-end flow rate is equal to the JVOL flow rate and the JVOL flow rate is equivalent to the PVOL flow rate. Thus, the performance information collection program 630 sets back-end flow rate=PVOL flow rate. Thereafter, the processing proceeds to the step S309.

S305 JVOL destage does not occur. Thus, the performance information collection program 630 sets back-end flow rate=0. Thereafter, the processing proceeds to the step S309.

S306 The performance information collection program 630 determines whether or not the data protection setting is Mirror. When the data protection setting is Mirror (S306; Yes), the processing proceeds to the step S307. When the data protection setting is not Mirror (S306; No), the processing proceeds to the step S308.

S307 Because of Mirror, a copy of the host data is transferred to the redundant node. The performance information collection program 630 calculates the back-end flow rate by the following expression, and the processing proceeds to the step S309.

back−end flow rate $= SVOL$ flow rate $+ \log$ data writing $+ SVOL$ redundancy flow rate $= 2 * PVOL$ flow rate$+\log$ data writing S308 Because of distributed parity, parity transfer data generated from the host data is transferred to the redundant node. The performance information collection program 630 calculates the back-end flow rate by the following expression, and the processing proceeds to the step S309.

back−end flow rate $= SVOL$ flow rate $+ \log$ data writing $+ mDnP$ parity transfer rate $= (1 + n/m) * PVOL$ flow rate$+\log$ data writing S309 The performance information collection program 630 determines whether or not calculation has been executed regarding all VOLS. When the volume regarding which calculation has not been executed exists (S309; No), the processing returns to the step S301. When calculation has been executed regarding all VOLS (S309; Yes), the processing of this diagram is ended.

Figure 14:
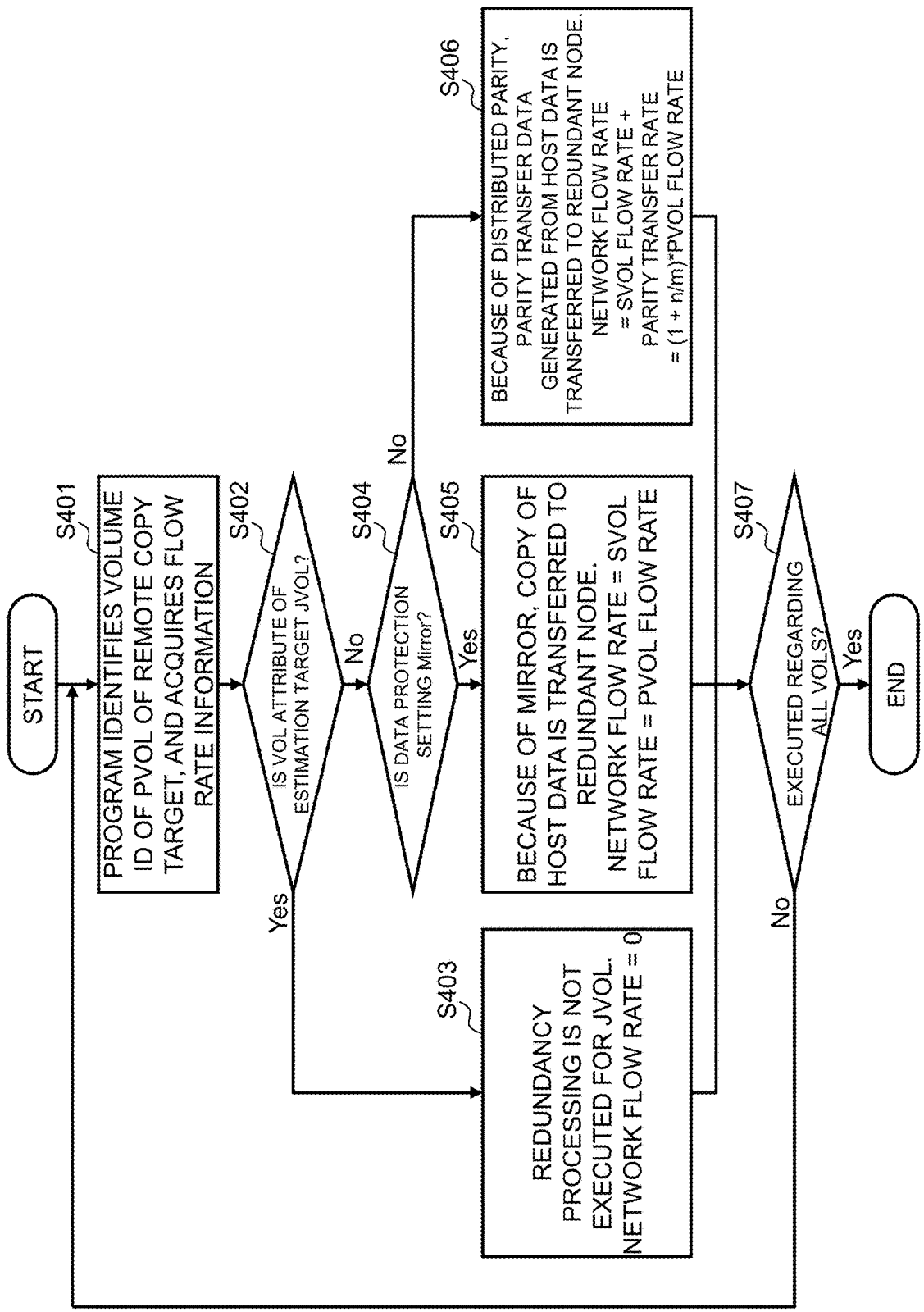
FIG. 14 is a flowchart for explaining details of input/output flow rate calculation processing of network data.

FIG. 14 is a flowchart for explaining details of the input/output flow rate calculation processing of network data (S110) illustrated in FIG. 11. In the input/output flow rate calculation processing of network data, the performance information collection program 630 sequentially executes the following steps S401 to S407.

S401 The performance information collection program 630 identifies the volume ID of the PVOL of the remote copy target and acquires flow rate information. Thereafter, the processing proceeds to the step S402.

S402 The performance information collection program 630 determines whether or not the volume attribute of the estimation target is the JVOL. When the volume attribute of the estimation target is the JVOL (S402; Yes), the processing proceeds to the step S403. When the volume attribute of the estimation target is not the JVOL (S402; No), the processing proceeds to the step S404.

S403 Redundancy processing is not executed for the JVOL. Thus, the performance information collection program 630 sets network flow rate=0. Thereafter, the processing proceeds to the step S407.

S404 The performance information collection program 630 determines whether or not the data protection setting is Mirror. When the data protection setting is Mirror (S404; Yes), the processing proceeds to the step S405. When the data protection setting is not Mirror (S404; No), the processing proceeds to the step S406.

S405 Because of Mirror, a copy of the host data is transferred to the redundant node. The performance information collection program 630 calculates the network flow rate by the following expression, and the processing proceeds to the step S407.

$$\text{network flow rate} = SVOL \text{ flow rate}$$
$$= PVOL \text{ flow rate}$$

S406 Because of distributed parity, parity transfer data generated from the host data is transferred to the redundant node. The performance information collection program 630 calculates the network flow rate by the following expression, and the processing proceeds to the step S407.

$$\text{network flow rate} = SVOL \text{ flow rate} + \text{parity transfer rate}$$
$$= (1 + n/m) * PVOL \text{ flow rate}$$

S407 The performance information collection program 630 determines whether or not calculation has been executed regarding all VOLS. When the volume regarding which calculation has not been executed exists (S407; No), the processing returns to the step S401. When calculation has been executed regarding all VOLS (S407; Yes), the processing of this diagram is ended.

Figure 15:
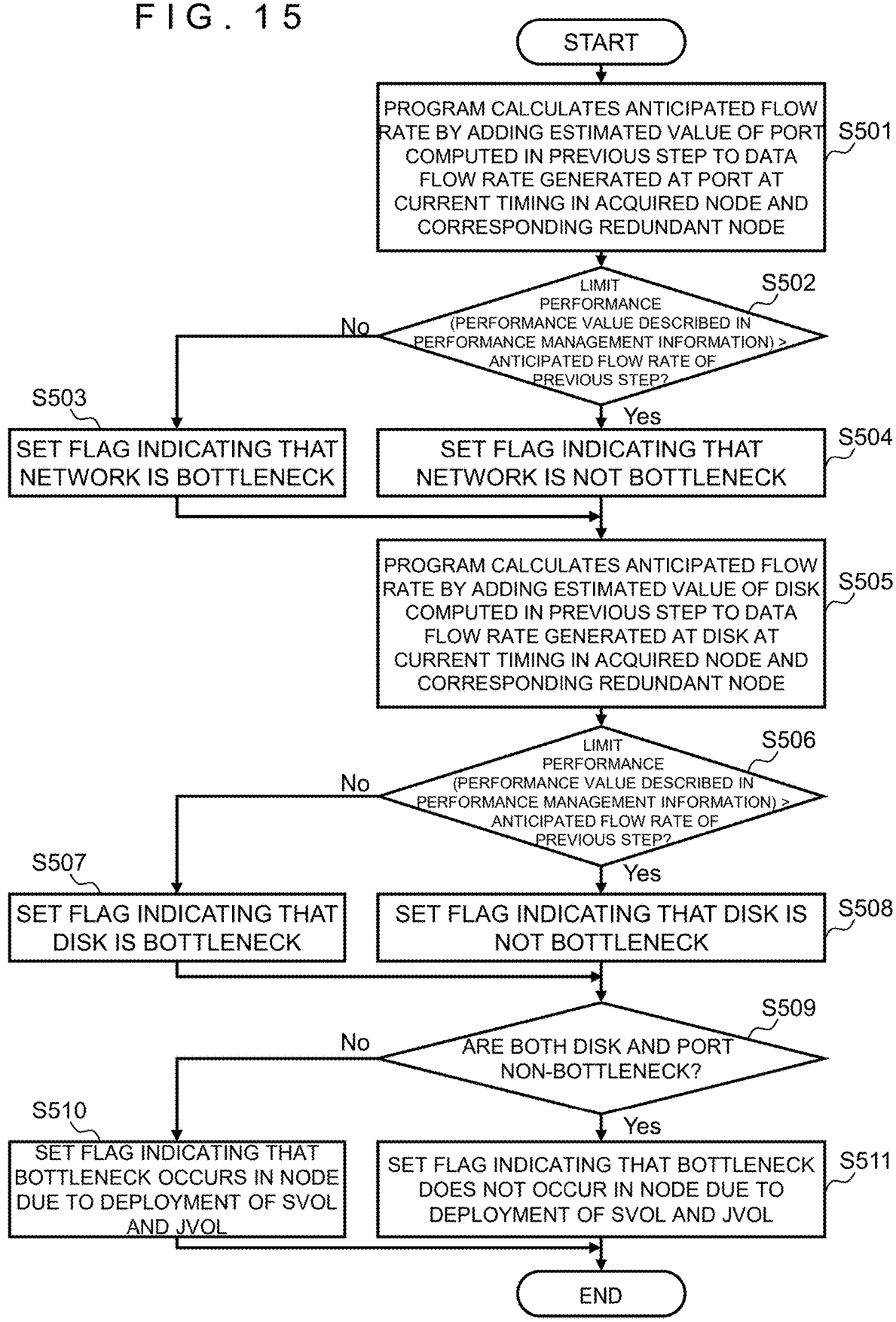
FIG. 15 is a flowchart for explaining details of performance bottleneck determination processing of a target node.

FIG. 15 is a flowchart for explaining details of the performance bottleneck determination processing of the target node (S111) illustrated in FIG. 11. In the performance bottleneck determination processing of the target node, the performance calculation program 631 sequentially executes the following steps S501 to S511.

S501 The performance calculation program 631 calculates an anticipated flow rate by adding the estimated value of the port computed in the previous processing (S110) to the data flow rate generated at the port at the current timing in the nodes (deployment destination node and corresponding redundant node) regarding which the performance information has been collected in S108. Thereafter, the processing proceeds to the step S502.

S502 The performance calculation program 631 determines whether the limit performance (performance value described in performance management information) is higher than the anticipated flow rate of the previous step (S501). When the limit performance is equal to or lower than the anticipated flow rate (S502; No), the processing proceeds to the step S503. When the limit performance exceeds the anticipated flow rate (S502; Yes), the processing proceeds to the step S504.

S503 The performance calculation program 631 sets a flag indicating that the network is a bottleneck. Thereafter, the processing proceeds to the step S505.

S504 The performance calculation program 631 sets a flag indicating that the network is not a bottleneck. Thereafter, the processing proceeds to the step S505.

S505 The performance calculation program 631 calculates an anticipated flow rate by adding the estimated value of the disk computed in the previous processing (S109) to the data flow rate generated at the disk at the current timing in the nodes (deployment destination node and corresponding redundant node) regarding which the performance information has been collected in S108. Thereafter, the processing proceeds to the step S506.

S506 The performance calculation program 631 determines whether the limit performance (performance value described in performance management information) is higher than the anticipated flow rate of the previous step (S505). When the limit performance is equal to or lower than the anticipated flow rate (S506; No), the processing proceeds to the step S507. When the limit performance exceeds the anticipated flow rate (S506; Yes), the processing proceeds to the step S508.

S507 The performance calculation program 631 sets a flag indicating that the disk is a bottleneck. Thereafter, the processing proceeds to the step S509.

S508 The performance calculation program 631 sets a flag indicating that the disk is not a bottleneck. Thereafter, the processing proceeds to the step S509.

S509 The performance calculation program 631 determines whether or not both the disk and the port are a non-bottleneck. When a bottleneck occurs in either of them (S509; No), the processing proceeds to the step S510. When both are a non-bottleneck (S509; Yes), the processing proceeds to the step S511.

S510 The performance calculation program 631 sets a flag indicating that a bottleneck occurs in the node due to deployment of the SVOL and the JVOL. Thereafter, the performance bottleneck determination processing of the target node is ended.

S511 The performance calculation program 631 sets a flag indicating that a bottleneck does not occur in the node due to deployment of the SVOL and the JVOL. Thereafter, the performance bottleneck determination processing of the target node is ended.

Figure 16:
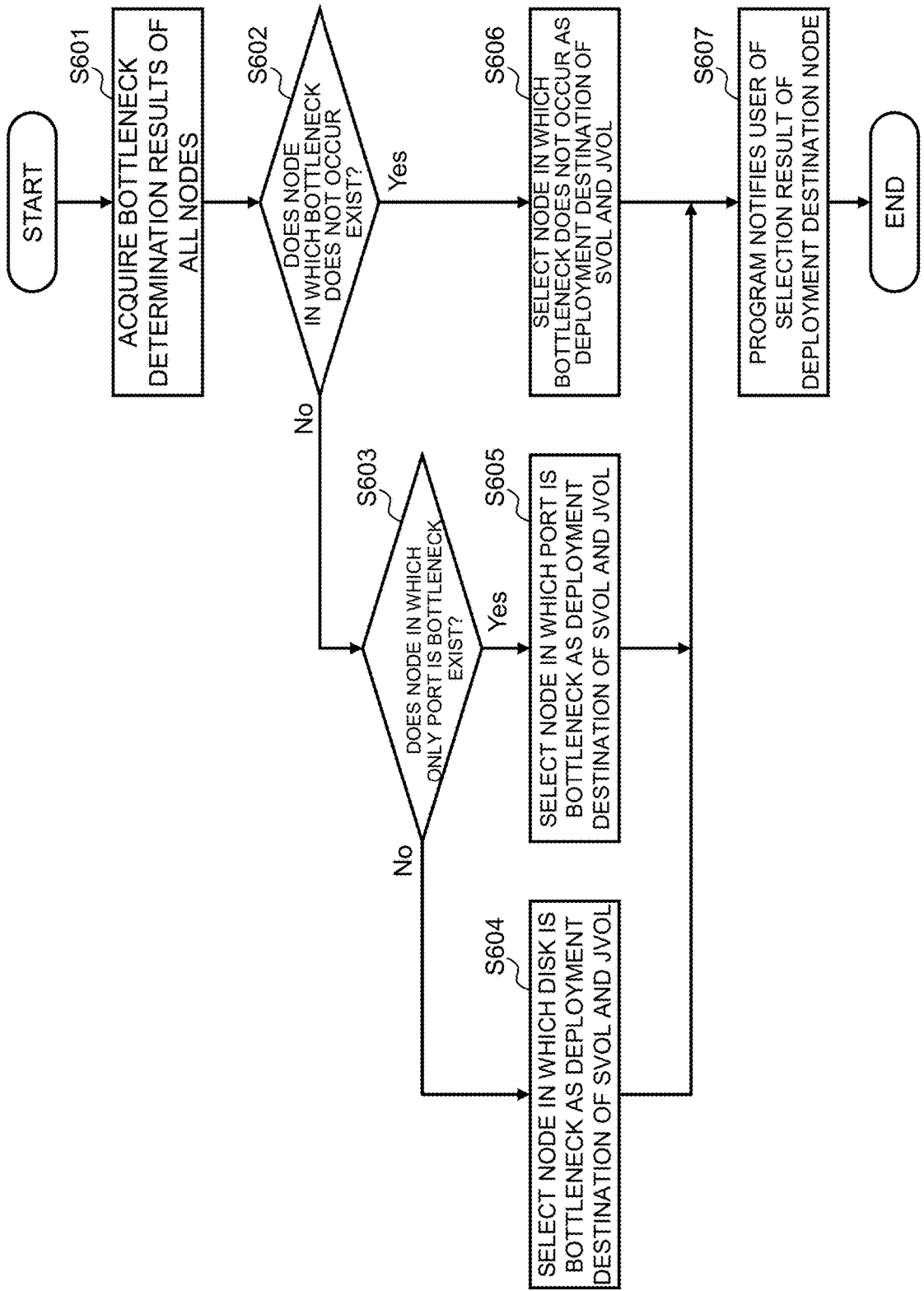
FIG. 16 is a flowchart for explaining details of SVOL deployment destination candidate decision processing.

FIG. 16 is a flowchart for explaining details of the SVOL deployment destination candidate decision processing (S113) illustrated in FIG. 11. In the SVOL deployment destination candidate decision processing, the volume deployment destination determination program 632 sequentially executes the following steps S601 to S607.

S601 The volume deployment destination determination program 632 acquires the bottleneck determination results of all nodes. Thereafter, the processing proceeds to the step S602.

S602 The volume deployment destination determination program 632 determines whether or not the node in which a bottleneck does not occur exists. When the node in which a bottleneck does not occur does not exist (S602; No), the processing proceeds to the step S603. When the node in which a bottleneck does not occur exists (S602; Yes), the processing proceeds to the step S606.

S603 The volume deployment destination determination program 632 determines whether or not the node in which only the port is a bottleneck exists. When the node in which only the port is a bottleneck does not exist (S603; No), the processing proceeds to the step S604. When the node in which only the port is a bottleneck exists (S603; Yes), the processing proceeds to the step S605.

S604 The volume deployment destination determination program 632 selects the node in which the disk is a bottleneck, as the deployment destination node of the SVOL and the JVOL. Thereafter, the processing proceeds to the step S607.

S605 The volume deployment destination determination program 632 selects the node in which the port is a bottleneck, as the deployment destination node of the SVOL and the JVOL. Thereafter, the processing proceeds to the step S607.

S606 The volume deployment destination determination program 632 selects the node in which a bottleneck does not occur, as the deployment destination node of the SVOL and the JVOL. Thereafter, the processing proceeds to the step S607.

S607 The volume deployment destination determination program 632 notifies the user of the selection result of the deployment destination node, and the SVOL deployment destination candidate decision processing is ended.

In this manner, the volume deployment destination determination program 632 sees the bottleneck determination results of all nodes, and preferentially selects the node in which a bottleneck does not occur, to decide it as the deployment destination.

The disk has a narrower bandwidth than the network and thus the disk bottleneck has a larger influence than the network bottleneck. Therefore, when either is a bottleneck, the node in which the network is a bottleneck is preferentially selected.

Figure 17:
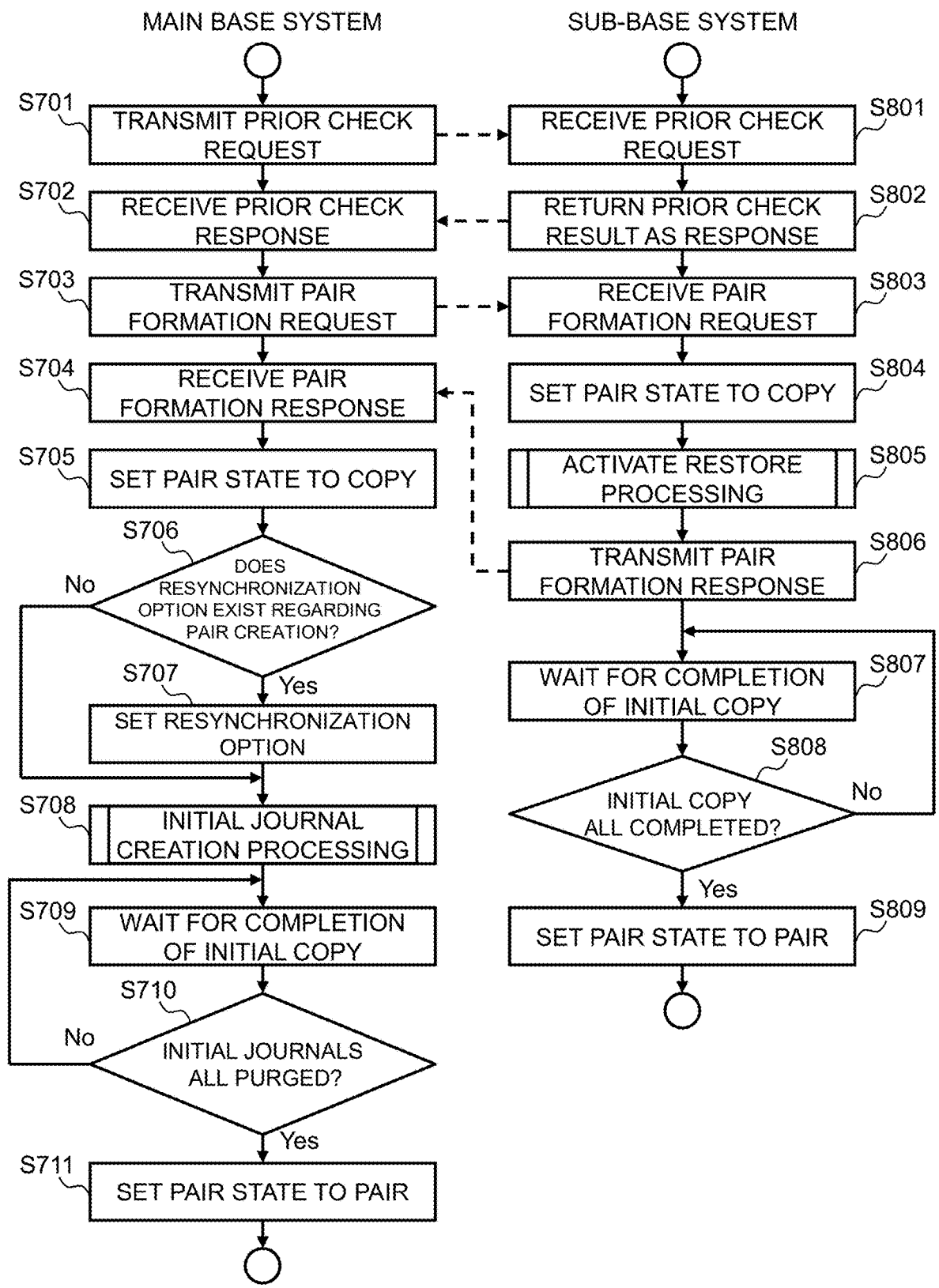
FIG. 17 is a diagram illustrating the flow of pair formation processing.

FIG. 17 is a diagram illustrating the flow of pair formation processing.

By the pair formation processing, a remote copy pair is formed by communication between a main base system and a sub-base system. In description of FIG. 17, a pair formation processing program 621P is a program in a main node having a PVOL candidate. A pair formation processing program 621S is a program in a sub-node having an SVOL candidate.

The pair formation processing program 621P transmits a prior check request to the pair formation processing program 621S (S701). The pair formation processing program 621S receives this request (S801), and executes a predetermined prior check regarding whether a VOL of a pair formation target exists, whether information on the counterpart apparatus is correct, and so forth. The pair formation processing program 621S returns a response to the prior check request (S802). This response represents the result of the prior check. The pair formation processing program 621P receives this response (S702).

When this response is a predetermined response, the pair formation processing program 621P transmits a pair formation request to employ a PVOL 102P as the PVOL candidate and employ an SVOL 102S as the SVOL candidate, to the pair formation processing program 621S (S703). The pair formation processing program 621S receives this request (S803), and forms a VOL pair (registers information in the pair management table 1020), and sets the state 1026 of this pair to "COPY" (S804). The pair formation processing program 621S activates restore processing (S805), and returns a response to the pair formation request (S806). The pair formation processing program 621S waits for the completion of initial copy (S807). When the initial copy has been completed (S808: Yes), specifically, when synchronization between data of the PVOL and data of the SVOL has been completed by a restore processing program 623S, the pair formation processing program 621S sets the state 1026 of this pair to "PAIR" (S809).

The pair formation processing program 621P receives the response transmitted in S806 (S704). When this response is a predetermined response, the pair formation processing program 621P forms a VOL pair (registers information in the pair management table 1020), and sets the state 1026 of this pair to "COPY" (S705). When a resynchronization option exists regarding this pair (S706: Yes), the pair formation processing program 621P sets the resynchronization option (S707).

The pair formation processing program 621P activates initial journal creation processing (S708). The pair formation processing program 621P waits for the completion of initial copy (S709). When all initial journals have been purged (S710: Yes), specifically, when the synchronization between the data of the PVOL and the data of the SVOL has been completed by the restore processing program 623S, the pair formation processing program 621P sets the state 1026 of this pair to "PAIR" (S711).

Figure 18:
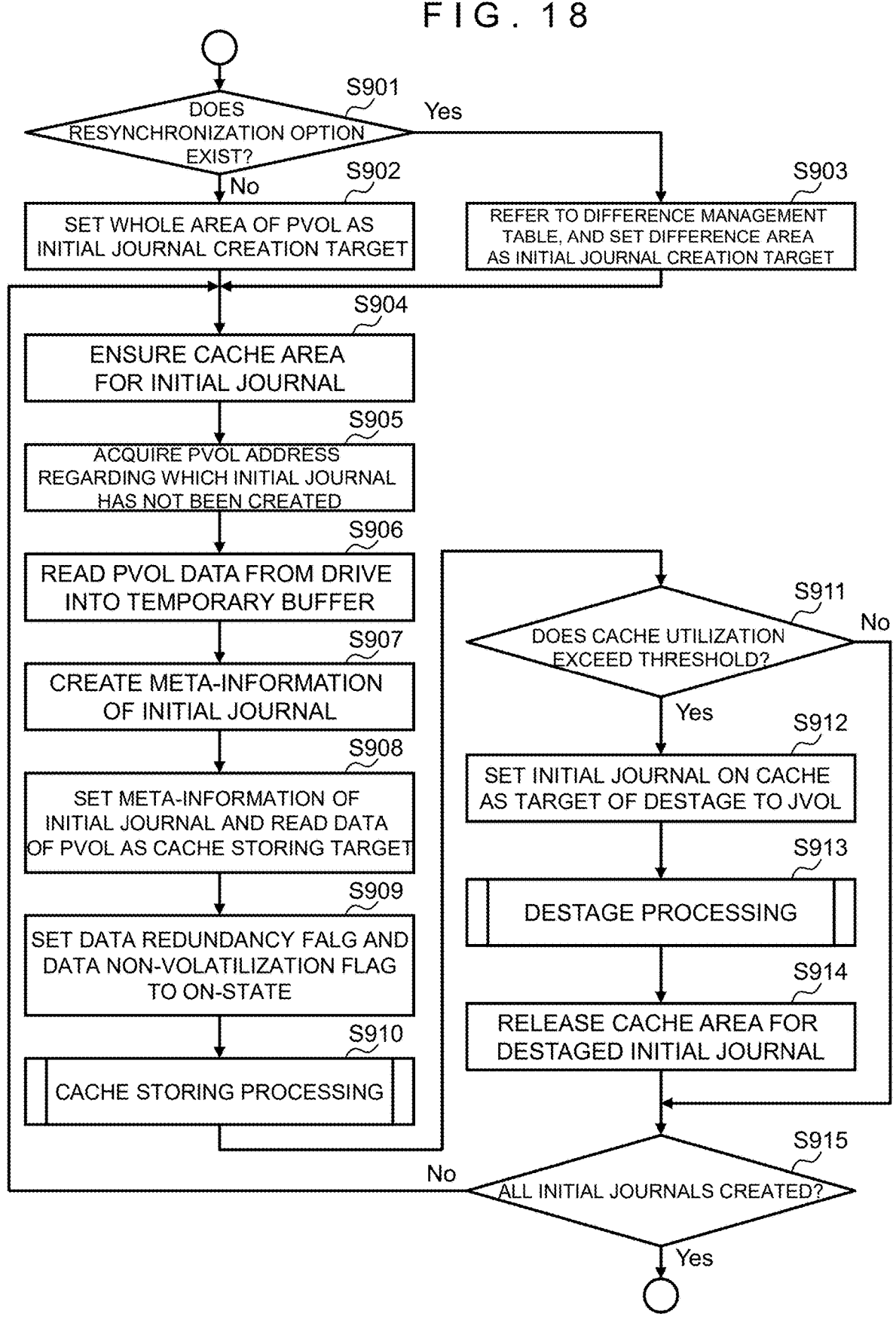
FIG. 18 is a diagram illustrating the flow of initial journal creation processing in a main site.

FIG. 18 is a diagram illustrating the flow of the initial journal creation processing in the main site.

When the initial journal creation processing is activated, this processing illustrated in FIG. 18 is executed. In this processing, the data of the PVOL is generated as the initial journal. The journal is basically placed on the cache. However, when the cache is full, the journal is destaged to the JVOL and data corresponding to the destage is purged from the cache. As the initial copy, full copy and differential copy exist. When the state 1026 of the pair is "SUSPEND," the journal is created only regarding the update difference in pair suspension by the differential copy. A redundancy flag and a non-volatilization flag are set regarding the cache segment, and writing is controlled in accordance with these flags.

When a resynchronization option is not set (S901: No), an initial journal creation processing program 622P sets data of the whole area of the PVOL as the creation target of the initial journal (S902). When a resynchronization option is set (S901: Yes), the initial journal creation processing program 622P refers to a difference management table (not illustrated) representing the difference between the PVOL and the SVOL, and sets data of the difference area as the creation target of the initial journal (S903).

The initial journal creation processing program 622P ensures the cache segment for the initial journal from a free queue (S904), and acquires the VOL address corresponding to this segment (PVOL address of the PVOL area in which data to be included in the initial journal exists) (S905). The initial journal creation processing program 622P reads out data from this address (S906), and creates metadata of the initial journal (S907). Then, the initial journal creation processing program 622P creates the initial journal including the data read out in S906 and the metadata created in S907, and sets this initial journal as the storing target (S908). For example, the metadata includes journal ID, LBA (VOL address), transfer length, pair ID, PVOL_ID, and SVOL_ID.

The initial journal creation processing program 622P sets both the redundancy flag and the non-volatilization flag in the redundancy-non-volatilization flag to "1" regarding the segment ensured in S904 (S909). The initial journal creation processing program 622P activates cache storing processing (S910).

When the cache utilization (for example, the ratio of the total capacity of the dirty segment and the clean segment to the whole capacity of the cache) exceeds a predetermined value (S911: Yes), the initial journal creation processing program 622P sets the initial journal in the cache segment as the destage target (S912), and activates destage processing (S913). The initial journal creation processing program 622P releases the cache segment having the initial journal destaged to the JVOL, that is, turns the cache segment into a free segment (S914).

When the initial journal that has not been created exists (S915: No), the processing returns to S904. When all initial journals have been created (S915: Yes), the initial journal creation processing is ended.

As described above, the storage system disclosed in the embodiment includes a main site (201a) that holds a primary volume that stores host data and a sub-site (201b) that holds a secondary volume that stores, by remote copy, a copy of the host data stored in the primary volume. In addition, the sub-site holds a journal volume that temporarily stores, as journal data, data to be subjected to the remote copy from the primary volume to the secondary volume. The main site has one or multiple nodes 210 having a processor, a memory, and a non-volatile storage medium. The sub-site has multiple nodes 210 having a processor, a memory, and a non-volatile storage medium. In the case of creating a new secondary volume and a new journal volume in the sub-site, a management program that operates in any node or a predetermined management apparatus predicts the load of data processing by the processor under an operation condition in which redundancy processing is executed in the sub-site regarding the new secondary volume, and predicts the load under an operation condition in which redundancy processing is not executed in the sub-site regarding the new journal volume, and selects the node that becomes the deployment destination of the new secondary volume and the new journal volume on the basis of the result of the prediction of the load.

This configuration and operation allow the storage system to predict the influence of the new deployment of the volumes on the performance with high accuracy.

Furthermore, the new journal volume stores data relating to remote copy to the new secondary volume. The new secondary volume and the new journal volume are deployed in the same volume.

Thus, the storage system can predict, with high accuracy, the influence on the performance in the case of deploying the new secondary volume and the new journal volume in the same volume.

Moreover, the management program acquires load information and performance information regarding each node of the sub-site. When the node becomes the node of the deployment destination, the management program predicts a network flow rate that is the flow rate of data generated due to communication with the external of the node and a disk flow rate that is the flow rate of data generated due to writing to the non-volatile storage medium inside the node, and predicts the load of data processing by the processor of the node of the deployment destination from the prediction result of the network flow rate and the disk flow rate. Regarding a redundant node that is a redundancy destination of the node of the deployment destination, the management program predicts the load of data processing by the processor of the redundant node after the new secondary volume and the new journal volume are deployed in the node of the deployment destination by adding the network flow rate and the disk flow rate of the node of the deployment destination to the load information of the redundant node. The management program selects the nodes regarding which the loads of the node of the deployment destination and the redundant node each fall within the range of maximum performance indicated by the performance information, as the node of the deployment destination and the redundant node, respectively.

Thus, the network flow rate and the disk flow rate can be each predicted.

Furthermore, in the prediction of the network flow rate, regarding the new journal volume, the management program does not reckon the network flow rate, and regarding the new secondary volume, the management program predicts that a network flow rate according to the load of a corresponding primary volume is generated.

Thus, the load of the network flow rate can be predicted with high accuracy according to the attribute of the volume.

Moreover, in the prediction of the disk flow rate, regarding the new journal volume, the management program does not reckon the load of the new journal volume in the case of a setting in which the secondary volume directly reflects data received by the sub-site from the main site, and predicts that the load of data processing according to the load of a corresponding primary volume is generated in the processor of the node of the deployment destination in the case of a setting in which the data received from the main site is temporarily stored in the journal volume. Regarding the new secondary volume, the management program predicts that a disk flow rate according to the load of the primary volume is generated, and predicts that the load of data processing according to the predicted disk flow rate is generated in the processor of the node of the deployment destination. Thus, the load of the disk flow rate can be predicted with high accuracy according to the attribute of the volume and the setting.

Furthermore, regarding all nodes of the sub-site, the management program predicts whether the load exceeds the performance and a bottleneck occurs in any node, when the node is employed as the deployment destination, and decides the node in which a bottleneck does not occur, as the deployment destination.

This can effectively avoid the occurrence of a bottleneck.

Moreover, the management program presents, to a user, the node selected as a candidate for the deployment destination of the new volumes, and accepts specifying of the deployment destination from the user.

This can deploy the volumes in the node that meets the desire of the user while allowing avoidance of a bottleneck.

Note that the present invention is not limited to the above-described embodiment and various modification examples are included therein. For example, the above embodiment is described in detail in order to explain the present invention in an easy-to-understand manner and is not necessarily limited to that including all configurations described. Furthermore, not only deletion of such a configuration but also substitution or addition of a configuration is also possible.

For example, in the above embodiment, the node in which only the port is a bottleneck is preferentially selected when a bottleneck occurs. However, the node in which only the disk is a bottleneck may be preferentially selected. Alternatively, a prediction result may be output and selection by the user may be accepted.

What is claimed is:

1. A storage system comprising:
a main site that holds a primary volume that stores host data; and
a sub-site that holds a secondary volume that stores, by remote copy, a copy of the host data stored in the primary volume, the sub-site holding a journal volume that temporarily stores, as journal data, data to be subjected to the remote copy from the primary volume to the secondary volume, wherein
the main site has one or multiple nodes having a processor, a memory, and a non-volatile storage medium,
the sub-site has multiple nodes having a processor, a memory, and a non-volatile storage medium, and
a management program that operates in any node or a predetermined management apparatus,
in a case of creating a new secondary volume and a new journal volume in the sub-site,
predicts, regarding the new secondary volume, a load of data processing by the processor under an operation condition in which redundancy processing is executed in the sub-site, predicts, regarding the new journal volume, the load under an operation condition in which redundancy processing is not executed in the sub-site, and selects a node that becomes a deployment destination of the new secondary volume and the new journal volume on a basis of a result of the prediction of the load.

2. The storage system according to claim 1, wherein
the new journal volume stores data relating to remote copy to the new secondary volume, and
the new secondary volume and the new journal volume are deployed in a same volume.

3. The storage system according to claim 1, wherein
the management program
   acquires load information and performance information regarding each node of the sub-site,
   when the node becomes the node of the deployment destination, predicts a network flow rate that is a flow rate of data generated due to communication with external of the relevant node and a disk flow rate that is a flow rate of data generated due to writing to the non-volatile storage medium inside the relevant node, and predicts a load of data processing by the processor of the node of the deployment destination from a prediction result of the network flow rate and the disk flow rate,
   regarding a redundant node that is a redundancy destination of the node of the deployment destination, predicts a load of data processing by the processor of the redundant node after the new secondary volume and the new journal volume are deployed in the node of the deployment destination, by adding the network flow rate and the disk flow rate of the node of the deployment destination to the load information of the redundant node, and
   selects nodes regarding which loads of the node of the deployment destination and the redundant node each fall within a range of maximum performance indicated by the performance information, as the node of the deployment destination and the redundant node, respectively.

4. The storage system according to claim 3, wherein
the management program, in the prediction of the network flow rate, does not reckon the network flow rate regarding the new journal volume, and predicts that a network flow rate according to a load of a corresponding primary volume is generated regarding the new secondary volume.

5. The storage system according to claim 3, wherein
the management program, in the prediction of the disk flow rate,
regarding the new journal volume, does not reckon a load of the new journal volume in a case of a setting in which the secondary volume directly reflects data received by the sub-site from the main site, and predicts that a load of data processing according to a load of a corresponding primary volume is generated in the processor of the node of the deployment destination in a case of a setting in which the data received from the main site is temporarily stored in the journal volume, and
regarding the new secondary volume, predicts that a disk flow rate according to the load of the primary volume is generated, and predicts that a load of data processing according to the predicted disk flow rate is generated in the processor of the node of the deployment destination.

6. The storage system according to claim 1, wherein
the management program presents, to a user, the node selected as a candidate for the deployment destination of the new volumes, and accepts specifying of the deployment destination from the user.

7. A management method for a storage system including
a main site that holds a primary volume that stores host data and
a sub-site that holds a secondary volume that stores, by remote copy, a copy of the host data stored in the primary volume, the sub-site holding a journal volume that temporarily stores, as journal data, data to be subjected to the remote copy from the primary volume to the secondary volume,
the main site having one or multiple nodes having a processor, a memory, and a non-volatile storage medium, the sub-site having multiple nodes having a processor, a memory, and a non-volatile storage medium,
the management method comprising:
by a management program that operates in any node or a predetermined management apparatus,
   in a case of creating a new secondary volume and a new journal volume in the sub-site,
   predicting a load of data processing by the processor under an operation condition in which redundancy processing is executed in the sub-site regarding the new secondary volume;
   predicting the load under an operation condition in which redundancy processing is not executed in the sub-site regarding the new journal volume; and
   selecting a node that becomes a deployment destination of the new secondary volume and the new journal volume on a basis of a result of the prediction of the load.

* * * * *